United States Patent [19]

Walters

[11] Patent Number: 5,132,938

[45] Date of Patent: Jul. 21, 1992

[54] ADJUSTING SEISMIC DATA TO TIE TO OTHER DATA

[75] Inventor: William L. Walters, Houston, Tex.

[73] Assignee: Shell Oil Company, Houston, Tex.

[21] Appl. No.: 739,075

[22] Filed: Jul. 31, 1991

[51] Int. Cl.$^5$ .............................................. G01V 1/30
[52] U.S. Cl. ....................................... 367/38; 367/48
[58] Field of Search .................. 367/13, 38, 48 X, 59, 367/60, 63; 364/421

[56] References Cited

U.S. PATENT DOCUMENTS 4,837,752  6/1989  Pepchinski ............................ 367/38
4,893,694  1/1990  Houck et al. ......................... 367/38

OTHER PUBLICATIONS

"Linearized Simultaneous Inversion for Source Wavelet Equalization and Mis-Tie Adjustment," M. Henry and George R. Mellman, 58th Annual Society of Exploration Geophysics International Meeting (Anaheim, Calif.), Abstracts 1988, pp. 953-955, (ISBN 0-931830-6-9-9; Paper No. S-11 6; abstract only).

*Primary Examiner*—Ian J. Lobo
*Attorney, Agent, or Firm*—Fred S. Reynolds, Jr.

[57] ABSTRACT

A method to adjust a common subsurface feature on seismic traces associated with line misties is provided so that the seismic traces are consistent about the common subsurface feature. The method uses traces which are uniquely located in an x-y coordinate system to reflect the actual location of the traces with respect to an intersection. In this method traces can be associated with a line of seismic data or can be isolated traces such as well-log synthetics or vertical seismic profiles. The traces make up sets of data. An intersection is selected and representative traces from two sets of data are initially selected and form trace pairs. A time gate is determined about a common subsurface features of interest on the representative traces. The time gate isolates a trace gate about the common subsurface feature on each trace leaving only the trace gates in the trace pairs. A time delay is determined for each trace pair. A least squares planar fit of the time delays of the trace pairs is made with respect to the intersection and a phase shift for the intersection is determined. The method is then repeated at additional intersections with other combinations of sets of data. After all of the sets of data and intersections have been processed, the phase shifts and time delays determined for each intersection are harmonized by a least squares fit to determine a single time shift and phase shift for each set of data. The traces from each set of data can then be adjusted by the determined time delay and phase shift for that set of data to make all sets of data consistent at the intersections. Additional embodiments provide methods for amplitude spatial equalization of the trace gates and trace calibration.

22 Claims, 7 Drawing Sheets

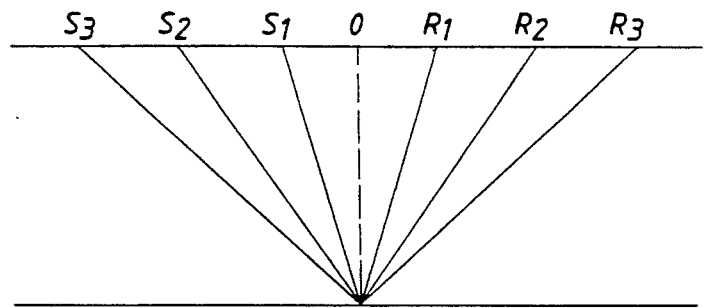
FIG.1A
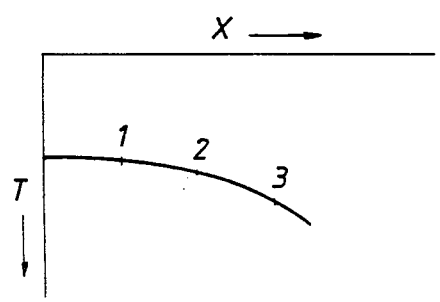
FIG.1B
1 79-DIG-01E
2 79-DIG-024
3 80-SRE-105
4 80-SRE-11203
5 82-SRE-143
6 80-DIG-026
FIG.3
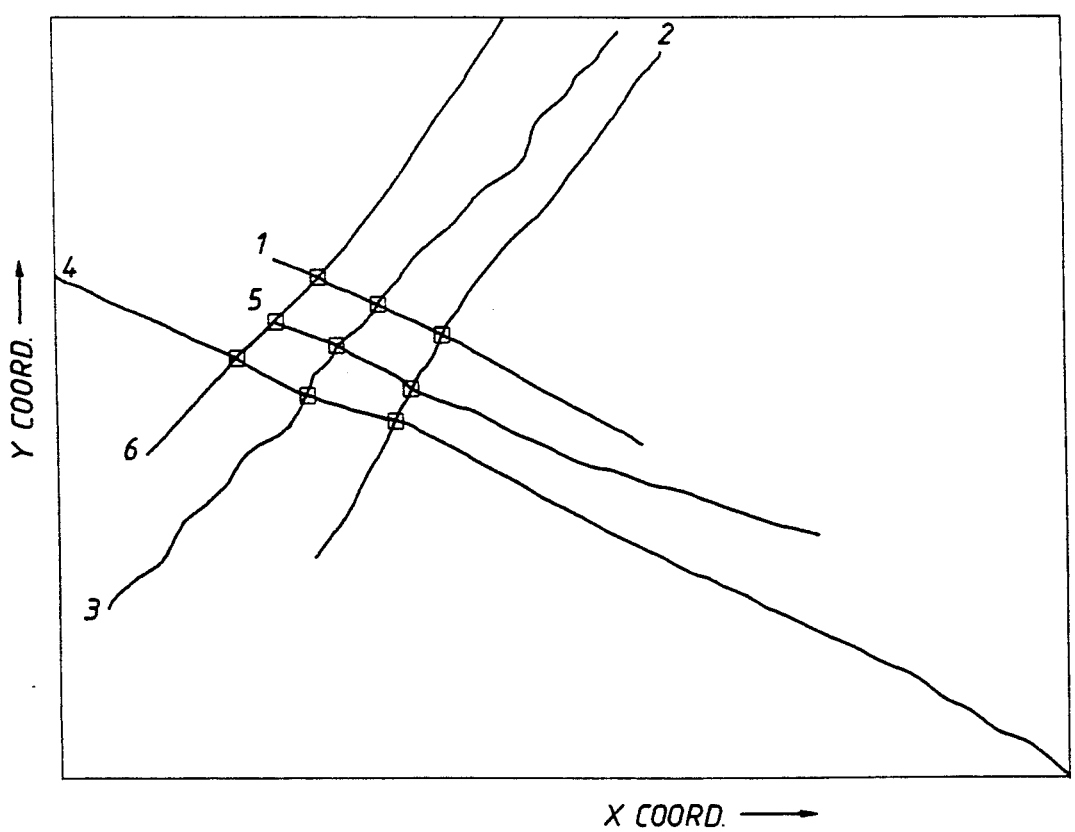

ADJUSTING SEISMIC DATA TO TIE TO OTHER DATA

BACKGROUND OF THE INVENTION

The present invention relates to processing seismic reflection data and more particularly, relates to the adjustment of seismic reflection data to be consistent with other data, such as seismic data, well-logs, or VSP traces.

Conventional land or marine seismic acquisition techniques involve the use of an appropriate source to generate seismic energy and a set of receivers, spread out along or near the surface of the earth on land or at or near the water surface or water bottom in a water covered area, to detect any reflected seismic signals due to seismic energy striking subsurface geologic boundaries. These signals are recorded as a function of time and subsequent processing of these time varying signals, i.e., seismic "traces" or seismic data, is designed to reconstruct an appropriate image of the geologic boundaries of the subsurface and to obtain information about the subsurface materials. In general terms, this conventional process has a seismic wave, from a source of seismic energy, traveling down into the earth, reflecting from a particular geologic interface (i.e., a change or contrast in elastic constants and/or densities), and returning to the surface, where it may be detected by appropriate receivers. In this specification reference is made to a subsurface feature; this means a particular seismic reflection or group of reflections representative of a specific geologic interface or grouping of geologic interfaces on a seismic trace.

It is generally the objective of seismic exploration to generate seismic energy, make measurements of the reflection amplitude of this energy at various offsets and for various times, and then, by employing various processing steps on these seismic data, to deduce the geometry as well as some of the elastic properties and densities of the materials of the earth through which the seismic energy has propagated and from which it has been reflected.

A seismic reflection from an interface will arrive at a receiver after a two-way travel time, denoted and used herein as, t(X), where X is defined and used herein as the distance between the source and the receiver, or "offset" distance. This "moveout time" t(X) may be used to "dynamically correct" seismic data acquired at an offset distance X so that a reflection is adjusted in time to appear as if it had been acquired at zero offset, i.e., X=0. Conventional "stacking" is accomplished by summing or averaging such dynamically corrected data.

Conventional processing of compressional-wave data uses data collected with many sources and many receivers and gathers the data by the common midpoint (CMP) technique, as illustrated in FIG. 1A. Traces with a common "midpoint" between the source and receiver are collected or gathered at a surface gather point. For example, in FIG. 1A, $S_1$ and $R_1$ are the source and receiver pair for the first trace and have a midpoint at the surface point(0). FIG. 1B depicts the corresponding hyperbolic moveout of such data (where the numbers used correspond to the subscripts used in FIG. 1A). That is, after the data have been acquired for a number of sequential source positions the traces for various source-receiver combinations are sorted or gathered into different midpoint groups which have the same or "common" surface location of the "midpoint" between the source and receiver positions (as depicted in FIG. 1A).

This sorted or gathered midpoint data is then analyzed or processed to determine effective velocities $V_e$, also called normal moveout velocities (or moveout velocities), for reflections from various depths, i.e., various values of $t_o$. One method is to determine for each a value of $V_e$ which provides dynamic corrections which maximize the resultant amplitudes of the "stacked" data in a time gate around $t_o$.

The original basis for CMP processing is the fact that each trace in a gather images (or comprises reflections from) approximately the same subsurface points, and, when properly adjusted for differing path times due to the different offsets, the set of corrected traces may be averaged to give an enhanced picture of the reflection response of the earth below that CMP surface location by emphasizing true primary reflections and discriminating against multiple reflections and other undesirable noise.

Thus, seismic data may be processed to obtain panels of seismic sections that extend from the line of acquisition on the surface of the earth down into the earth. For conventional 2 D data, several such "lines" (also referred to herein as "lines of seismic data") may be obtained over an area of interest. These lines of seismic data often intersect and the problem of how to recognize and align common subsurface features at the points of intersection arises. If the common subsurface features are not consistent, i.e., do not align, a mistie results.

Prior attempts to align such subsurface features at points of intersection have consisted mainly of cross-correlation procedures to estimate the time misalignment between intersecting lines of seismic data. However, if the reflection waveforms on two intersecting lines differ in shape, cross-correlation cannot correctly estimate time shifts between such lines. Other attempts generate filters (based on cross-correlations) with large numbers of variables to make one line "look" like the other; this technique can make anything look like anything else, i.e., with large numbers of variables any line can be made to match some other line.

Vertical seismic profile traces (VSP) and well-log synthetic traces are not acquired or processed in the same manner as seismic traces, consequently, using this data in conjunction with lines of seismic data could also result in common subsurface features on the traces not aligning at an "intersection" between the lines of seismic data and the VSP and well-log synthetic traces. Although, the VSP and well-log synthetic traces may not have been acquired directly on the line of seismic data, i.e. intersect with the lines, in this specification, the non-alignment of the this data at an actual intersection or hypothetical intersection, due to disparate processing and acquisition techniques, will also be referred to as a mistie or the data is not consistent.

In addition, although the acquisition and processing of "conventional seismic traces" was heretofore discussed, VSP traces and well-log synthetic traces are not acquired or processed in exactly the same manner. However, since VSP and well-log synthetic traces carry the same representative information and the invention of this specification treats all traces the same, the term "seismic traces" will also encompass both VSP and well-log synthetic traces for this specification,. A "seismic trace" according to this specification is a time varying signal having variations in amplitude and phase representing reflections from subsurface features.

SUMMARY OF THE INVENTION

It is a purpose of the present invention to provide an improved method in preferred embodiments for adjusting a common subsurface feature on seismic traces from different sets of data to be consistent at intersections.

It is a further purpose of the present invention to provide a method in preferred embodiments for adjusting a common subsurface feature on lines of seismic data and a well-log synthetic trace to be consistent between the well-log synthetic trace and the lines of seismic data at an intersection.

It is an additional purpose of the present invention to provide a method in preferred embodiments for adjusting a common subsurface feature on lines of seismic data and a vertical seismic profile trace to be consistent between the VSP trace and the lines of seismic data at an intersection.

It is a further purpose of the present invention to provide a method in preferred embodiments for adjusting a common subsurface feature on a VSP trace and well-log synthetic trace to be consistent between the VSP trace and the well-log synthetic trace at an intersection.

It is an additional purpose of the present invention to provide a method in preferred embodiments for determining the phase shift and time delay at an intersection between portions of seismic traces, i.e. trace gates, having a common subsurface feature from two different sets of data.

It is a further purpose of the present invention to provide a method in preferred embodiments for adjusting a subsurface feature on lines of seismic data at an intersection which are not strictly linear or straight. The preferred methods will also provide trace adjustment of a common subsurface feature for randomly distributed seismic traces near a hypothetical intersection where there is no actual intersection with either line of seismic data or other randomly distributed seismic traces.

It is an additional purpose of the present invention to provide a method in preferred embodiments for spectral matching of seismic traces within a time gate.

It is a further purpose of the present invention to provide a method in preferred embodiments for developing correspondence between groups of traces acquired by different acquisition techniques by rendering the traces alike using trace calibration.

In preferred embodiments of the present invention, methods are provided for adjusting processed seismic data to be consistent at an intersection with other data representative of sub-surface features of interest to aid in interpretation of the seismic data. Such other data may be lines of seismic data, well-log, or VSP surveys. The seismic traces which are representative of the data, are located by x-y coordinates. This allows the spatial distribution of seismic traces to be input into the preferred embodiments. The x-y coordinate system for the seismic traces allows the use of randomly distributed seismic traces and lines of seismic data which are not straight. In addition, the preferred methods will provide a means for adjusting a common subsurface feature on seismic data when there is not a common intersection point for the sets of data. Preferred embodiments of this invention allow the intersection to be selected; consequently hypothetical intersection points can be used where the sets of data are to be made consistent about a common subsurface feature.

The preferred methods of this invention provide consistency for sets of data at intersections by a process involving three-stages: trace pairs, intersections, and harmonization.

In the trace pairs stage of a preferred embodiment, a specific intersection is selected and two sets of data are chosen. At least one seismic trace is selected from each set of data. Each trace is paired with at least one trace belonging to the other set of data to form a trace pair. Other trace pairs may be formed in the same manner forming a set of trace pairs. A time gate is selected on each set of data which isolates a portion of each selected trace around a common subsurface feature of interest. The isolated portion is herein called a trace gate. A single trace pair is selected and a time delay between the two trace gates in the trace pair is determined. This step is repeated until the time delay has been determined for each trace pair. In addition, at this stage a quality factor can be computed for each trace pair to eliminate trace pairs which have bad data.

After time delays are determined for all trace pairs, the time delays are passed to the intersection stage. In this stage the x-y coordinates of the trace gates are used to determine a single time delay for the intersection by a least squares planar fit. After the time delay is determined a single phase shift for the intersection can then be determined. With the phase shift and the time delay determined, a quality factor for the intersection can also be estimated. The pairs stage and intersection stage are repeated until all sets of data and all desired intersections have been processed.

In the harmonization stage, the phase shifts and time delays determined in the intersection stage are harmonized by a least squares fit over all the intersection time delays and all the intersection phase shifts to provide a phase shift and a time delay for each set of data. The values for each set of data can then be used to adjust all of the traces in each set of data so that the common subsurface feature on the seismic traces will be consistent at the intersections used in this process. By this method, the misties between seismic lines or other forms of seismic data are reduced at the intersections.

Because the sets of data used in this process may have been obtained by disparate acquisition and processing techniques, the amplitude spectra of the seismic traces could be different. In a preferred embodiment an additional stage is added to the process to match the amplitude spectra of the trace gates to improve the accuracy of the process. One embodiment determines an incoherent filter which matches the signal power and the noise power in the trace gates. Another embodiment, determines a coherent filter which matches the signal power in the trace gates.

These and other objects and advantages of the present invention will no doubt become apparent to those of skill in the art after having read the following detailed description of the preferred embodiments which are contained herein and illustrated by the various figures.

The invention encompasses the heretofore described preferred embodiments as well as other embodiments as are described hereinafter and as will be apparent to those of skill in the art.

BRIEF DESCRIPTION OF THE DRAWINGS

FIGS. 1A and 1B depict common midpoint (CMP) acquisition geometry and hyperbolic moveout for data acquired using this geometry.

FIG. 3 depicts a display showing a simulated map of the layout of lines of seismic data intersecting.

DETAILED DESCRIPTION OF THE INVENTION

LINTIE

Figure 2:
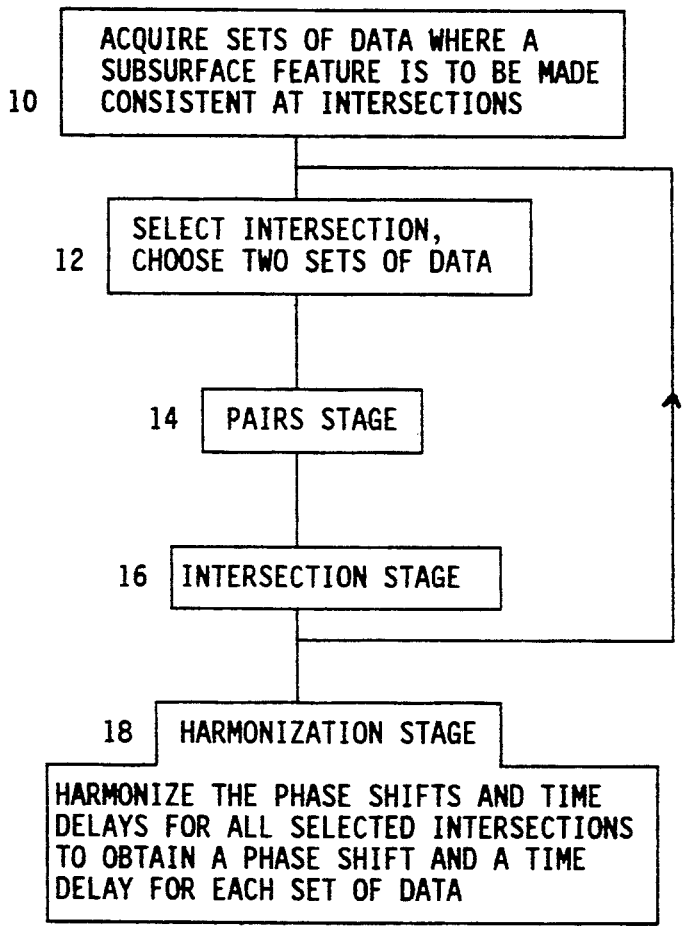
FIG. 2 depicts a simplified flow chart of the processing steps of a method of the present invention.

A technique to adjust misties, called "LINTIE," provides for adjusting processed seismic data to be consistent with other data representative of a common subsurface feature at an intersection to aid in interpretation of the seismic data. Such other data may be lines of seismic data, well-logs, and/or VSP (vertical seismic profiles) surveys. The technique matches the seismic data to the other data at areas of intersection by determining a scaling factor, a phase shift and a time shift to be applied to the seismic data to make it consistent with the other data at the areas of intersection. In this specification an "intersection" represents a region of proximity between two sets of data over which reflections originate from approximately plane parallel layers with approximately constant reflection coefficients. The methods of LINTIE also optimize such adjustments over many such areas of intersection.

LINTIE also provides an improved method for interpreting and evaluating conventionally processed and conventionally acquired seismic field data. This method provides a way to estimate amplitude scalings, time shifts, and phase shifts associated with intersecting seismic line misties to allow for "adjustment" of the lines to make the lines consistent, i.e., to remove the "mistie." The method of LINTIE for intersecting seismic lines uses a straightforward least squared error criterion to determine the optimal time shift, phase shift, and scale factor between two lines at an intersection point. The LINTIE model assumes that, within a specified time gate, and in the vicinity of the intersection, the reflections are from approximately plane parallel layers. LINTIE also assumes that the intersecting seismic lines are straight or at least piecewise linear, i.e., straight sections. In addition, LINTIE assumes that the adjusted seismic data has the same amplitude spectra as the reference seismic data. The sum of the squared deviations between the traces from a reference line and the scaled, shifted and phase rotated traces from an adjusted line for all samples within a specified time gate "near" the intersection of the two lines is minimized. From a set of such line intersections the time shifts and phase shifts are harmonzied in a least squared difference sense to determine a single time shift and phase shift to be applied to each line, so that within the time gates all lines are consistent with each other at all such intersections.

LINTIE was developed to provide trace calibration. Trace calibration is a recurring problem in reflection seismology. "Trace calibration" is used herein to mean finding a transformation between the trace to be calibrated and a reference trace which renders the traces alike in some sense. The two traces might be any pairing of seismic data; lines of seismic data, well-log synthetic traces, and VSP traces. Examples of calibration problems include tying intersecting lines of seismic data, lines of seismic data to well-log comparisons, and similar comparisons involving VSPs.

LINTIE assumes that it is reasonable to require that the calibration transformation be consistent with the degrees of freedom in the comparison gate, i.e., the time gate. Such transformation relationships should be parsimonious or efficient. That is, such relationships between the traces should compensate for the greatest discrepancy between the traces but with the fewest possible number of parameters.

When the signal-to-noise ratio is high, most of the difference or a great portion of any trace difference can often be efficiently reduced by a constant phase shift, a time delay, and a simple scale factor. This observation is the basis of the methods of LINTIE.

The following general description of the estimation and adjustment method of LINTIE is cast in terms of the case of two intersecting seismic lines. The problem of tying intersecting lines is more general than well-log calibration in the sense that more trace pairs are available. Although the fundamentals of the estimation procedure are the same for both problems, differences in implementation for LINTIE are as follows. Briefly, for well-logs only a single pair of traces is considered at a time and a synthetic trace may be built with time-varying bandpass and stretch from reflection coefficients obtained from the well-log. Subsequent estimation computations are the same in both cases.

The model on which the methods of LINTIE are based is a set of approximately plane parallel layers. Within a specified time gate, and in the vicinity of the intersection, the reflection(s) are assumed to be from these plane parallel layers. LINTIE can be described as having three stages: trace pairs, intersections, and harmonization. In the trace pair stage, the traces within the time gate on one line are designated $f_i(t)$ and the traces on the other line are designated $g_j(t)$ and $h_j(t)$ is the Hilbert transformation of trace $g_j(t)$. The Hilbert transformation relates an original trace to a phase shifted version of that trace, where the phase shift is arbitrary. To minimize the sum of the squared deviations between the traces $f_i(t)$ and the scaled, shifted and phase rotated version of $g_j(t)$ for all samples in the specified time gate and for all pairs of traces near the intersection of the two lines, the following equation results, $$E = \sum_{ij} \int |f(t) - A_{ij}\{\cos\phi g(t + \tau_{ij}) + \sin\phi h(t + \tau_{ij})\}|^2 dt. \quad (1)$$

where $A_{ij}$ are scaling factors, $\phi$ are phase angles, and $\tau_{ij}$ are time shifts. The time shifts $\tau_{ij}$ are indexed by trace pair to allow for structure (relative dip) at the intersection. This general error function of LINTIE provides for variable scale factors for each trace pair. This provides an unbiased estimator in the presence of large trace-to-trace amplitude variations. Assuming all trace pairs are independent, minimizing E with respect to all the $A_{ij}$ is accomplished by minimizing each term in the sum, which yields the result $$A_{ij} = \frac{\cos\phi \int f(t)g(t + \tau_{ij})dt + \sin\phi \int f(t)h(t + \tau_{ij})dt}{\int \cos\phi g(t + \tau_{ij}) + \sin\phi h(t + \tau_{ij})^2 dt} \quad (2)$$

Substituting this expression into Equation (1) gives for the ij-th term in the sum:

$$E_{ij} = \int f^2(t)dt\{1 - E'_{ij}\} \quad (3)$$

where $$E'_{ij} = \frac{\{\cos\phi \int f(t)g(t + \tau_{ij})dt + \sin\phi \int f(t)h(t + \tau_{ij})dt\}^2}{\int f^2(t)dt \int \{\cos\phi g(t + \tau_{ij}) + \sin\phi h(t + \tau_{ij})\}^2 dt}. \quad (4)$$

The methods of LINTIE search the $\phi$-$\tau$ plane within the time gate for the maximum of this function for a single pair of traces.

This maximum, for narrow-band, noisy data is often broad, poorly defined, and hence ambiguous. For a monochromatic sinusoid, phase-shift and time delay are indistinguishable. Since a variety of $\phi$-$\tau$ combinations can give about the same least squared error, the particular choice of $\phi$-$\tau$ may seem unimportant. However, a particular choice of $\phi$-$\tau$ may profoundly affect the character of a specific objective event, i.e. a subsurface feature which the interpreter seeks consistency between lines of data. In LINTIE, there is no solution for this ambiguity, although this is a problem only for narrow-band data. Differential time stretch between well-log data and seismic data also has been found to have a sensitive impact on the estimates; well-log data may have time errors which in turn cause time errors in any synthetic generated therefrom.

In order to provide a rationale for making a more definite $\phi$-$\tau$ choice, the method of LINTIE uses a long time gate approximation. For long time gates, expression (4) can be simplified to remove any phase dependence by using $$\int g^2(t+\tau_{ij})dt \simeq \int h^2(t+\tau_{ij})dt \quad (5)$$

and $$\int g(t+\tau_{ij})h(t+\tau_{ij})dt << \int g^2(t+\tau_{ij})dt \quad (6)$$

which gives $$E'_{ij} \simeq \frac{\{\cos\theta \int f(t)g(t + \tau_{ij})dt + \sin\theta \int f(t)h(t + \tau_{ij})dt\}^2}{\int f^2(t)dt \int g^2(t + \tau_{ij})dt}. \quad (7)$$

The total error function ($E_{ij}$) is still nonlinear if a multi-trace estimation of a single phase shift and time shift relation for all times is desired. To linearize the problem, a time shift and phase shift are solved independently for each pair of traces, then the time shifts may be fit to a bilinear form which is appropriate for the model of plane parallel layers. Using the intercept time and slopes, a multi-trace estimate of the single phase shift is made by appropriately summing over all pairs shifted according to the fitted time shifts. For the independent optimal values of $\tau_{ij}$, $$\tan\phi_{ij} = \frac{\int f(t)h(t + \tau_{ij})dt}{\int f(t)g(t + \tau_{ij})dt} \quad (8)$$

When substituted into Equation (7) this gives $$E'_{ij} = \frac{\{\int f(t)g(t + \tau_{ij})dt\}^2 + \{\int f(t)h(t + \tau_{ij})dt\}^2}{\int f^2(t)dt \cdot \int g^2(t + \tau_{ij})dt} \quad (9)$$

which is an "envelope" function from which the independent values of $\tau_{ij}$ may be determined by a direct search for a maximum. (The "envelope" function is insensitive to any phase rotation but is sensitive to time shifts.) The time shifts ($\tau_{ij}$) are then used in Equation (8) to determine the phase shifts.

These time shift values are then fit to a bilinear form, as follows, for the intersection stage $$\tau_{ij} = \tau_0 + \alpha(i - i_0) + \beta(j - j_0) \quad (10)$$

where $i_0$ and $j_0$ are the trace indices corresponding to the line intersection and $\tau_0$ is the time shift at the point of intersection. The fitted time shift ($\tau_{ij}$) for any other trace pair "near" an intersection may then be determined from this equation. The use of all the traces "near" an intersection may be used to assist in a better fit and provide multi-trace estimates. The multi-trace estimate of the phase shift may then be determined by minimizing with respect to $\phi$ the total difference function $$E = \Sigma_{ij} \int f^2(t)dt\{1 - E'_{ij}\} \quad (11)$$

where $E'_{ij}$ is the approximate form given by Equation (7) using the specified values for the time shifts $\tau_{ij}$ from Equation (10). This gives $$\tfrac{1}{2}\tan 2\phi = \frac{\Sigma_{ij} \frac{P_{ij}Q_{ij}}{R_{ij}}}{\Sigma_{ij} \frac{P_{ij}^2 - Q_{ij}^2}{R_{ij}}} \quad (12)$$

where $P_{ij}$ is the cross correlation of the two traces $$P_{ij} = \int f(t)g(t+\tau_{ij})dt \quad (13)$$

$Q_{ij}$ is the cross correlation of trace $f_i$ with the Hilbert transform of trace $g_j$ $$Q_{ij} = \int f(t) h_j(t+\tau_{ij}) dt \tag{14}$$

and $R_{ij}$ is a shifted normalization function of the trace $g_j$ $$R_{ij} = \int g^2_j(t+\tau_{ij}) dt \tag{15}$$

The intersection time shift $\tau_o$ and optimal phase shift are determined and saved for each line intersection.

In the harmonization stage, the time shifts for the intersections of a set of lines are harmonized in a least squared difference sense by minimizing $$D_t = \sum_{ab} |t_a - t_b - t_{ab}|^2. \tag{16}$$

subject to the constraint that the sum of all time shifts must be zero. No rejection logic or loop-skip logic is applied for the time shifts.

Phase shifts are ambiguous since any multiple of $2\pi$ added to the phase shift between two lines will work as well. The same basic harmonization procedure that is used for time shifts is also applied to phase shifts but in this case to avoid loop skips the objective function is $$D_\phi = \sum_{ab} \sin^2\left(\frac{\phi_a - \phi_b - \phi_{ab}}{2}, \right).$$

Although LINTIE has proven to be effective in trace calibration, LINTIE has significant limitations. The phase shift determined by Equation (12) is an estimate. An exact solution using a least squares equation would provide more accuracy in the later steps of LINTIE. The methods of LINTIE are appropriate to the use of SSP numbers (sub-surface point numbers). The SSP system merely associates a line trace with a common midpoint. Since its only purpose is to index a trace, it does not provide the location of that trace with respect to the intersection where the trace calibration is to be determined (see Equation (10)). Consequently, LINTIE assumes that all traces are in a straight line with respect to the intersection. However, all seismic data is not collected in straight lines. In fact, there is considerable spatial distribution of traces because of surface obstacles. Unless the individual traces can be associated with a specific spatial location with respect to the intersection, structure (relative dip) near the intersection may introduce error in the LINTIE methods. This is because LINTIE locates traces using SSP numbers and assumes constant trace spacing between the SSP numbers. With all data having the same relative weight in the LINTIE process, relative dip can introduce error. Also, LINTIE assumes that the traces being compared have equal amplitude spectra. However, different acquisition and processing methods produce difference amplitude spectra. Different amplitude spectra between the traces leads to errors in the trace calibration process.

These and other limitations of LINTIE are overcome by the preferred embodiments of the present invention, and an improved method is provided for adjusting seismic data having a common subsurface feature to compensate for mismatched line intersections, well-log or VSP surveys.

Preferred Embodiments

The preferred embodiments of the invention will also be described in terms of two intersecting lines of seismic traces. However, it should be recognized by those who practice the art that the preferred methods herein described can be used to adjust, alone or in groups making up one set of data, single traces of seismic data with other single traces of data having a common subsurface feature such as: well-log synthetic traces, vertical seismic profiles (VSP), and a single trace from a line of seismic data.

In addition, when using the techniques of the preferred embodiments of this invention to adjust lines of seismic data or vertical seismic profiles with well-log synthetic traces, the VSP or lines of seismic data should, preferably, be stacked and migrated prior to the use of the preferred embodiments of this invention. For lines of seismic data or VSP trace calibration, time and phase adjustments are, preferably, estimated from unmigrated, stacked data. The data is then migrated after the traces are adjusted.

Prospects often have several vintages of data available which have been subjected to disparate acquisition and processing. The use of LINTIE has enhanced the ability to adjust seismic data at an intersection. However, LINTIE, as mentioned, uses assumptions which inherently reduce the accuracy of the phase and time shifts required to remove the mistie. The preferred embodiments of this invention correct at least three major factors which reduce the accuracy of the LINTIE method.

Like LINTIE, the preferred embodiments have three stages: trace pairs, intersection, and harmonization. However, the preferred embodiments use different methods in the trace pairs stage and in the intersection stage to determine a more exact solution to the time shift and phase shift at the intersection. The ability to determine a more exact solution to the various time differences in the pairs stage and the time difference at the intersection significantly improves the accuracies of the phase shifts and time delays determined in the harmonization stage.

In addition, LINTIE assumes that all traces were located on a straight line with approximate equal distances between the traces in the intersection stage. The methods of the preferred embodiments do not inherently distort the effect of dip near the intersection because the spacing of the traces used in the preferred embodiments are not assumed to be located at regular intervals. This improves the resolution of relative dip near the intersection and the accuracy of the time delay determined for the intersection.

Finally, certain preferred embodiments do not assume that the amplitude spectra of all traces are the same. Because, different acquisition and processing techniques have an impact on the amplitude spectra of traces, in certain preferred embodiments an additional stage is added to reduce the errors in the trace pairs stage which can result from using traces which have different amplitude spectra.

Additionally, a preferred embodiment will allow eliminating or constraining adjustment of specific sets of data in the harmonization stage.

The before mentioned preferred embodiments will provide the interpreter of seismic data with an ability to track a common subsurface feature from line to line or isolated seismic trace to isolated seismic trace at an intersection with less ambiguity. This is possible because the present invention adjusts the seismic traces using time and phase differences determined by more accurate processes than the processes of LINTIE to render the common subsurface feature on the seismic data more consistent at the intersection.

An explanation of the methods of the preferred embodiments using lines of seismic data as a general case are herein provided with the different stages explained separately. Although the preferred embodiments do not significantly change the actual processing method of the harmonization stage of LINTIE, a more detailed explanation is provided for completeness than was provided heretofore.

Trace Pairs Stage

At a specific intersection, a set of traces is selected for each line, resulting in many possible pairs.

The selected traces are examined for a common subsurface feature and a time gate is centered over the subsurface feature which isolates a portion of trace containing the subsurface feature forming a trace gate. In the preferred embodiment of the present invention, it is possible to select a specific time gate length for the trace gates to be processed. As with LINTIE, the selected time gate length (trace gate) should be long to reduce ambiguity in the processing steps.

The objective of the trace pair computations is the determination of a time delay between the trace gates isolated by the time gate which now make up a trace pair. A time delay is determined for each trace pair. Phase shifts can also be determined for individual trace pairs, although they are not necessary to complete the methods of this invention. However, the desired time delay must be determined in the presence of an arbitrary constant phase shift. To accomplish this, the analytic signal and the complex cross-correlation between two analytic signals (the trace gates) are exploited. To provide motivation for the analytic signal formulation, consideration has been given to the model for a constant phase shifted trace. If f(t) is a real trace, q(t) its Hilbert transform, and r(t) the corresponding constant phase rotated trace, then $$r(t) = \cos\phi \cdot f(t) - \sin\phi \cdot q(t) \tag{17}$$

where $\phi$ is the phase angle and q(t), the "quadrature trace," is $$q(t) = \frac{1}{\pi} \cdot \int_{-\infty}^{\infty} \frac{f(x)}{t-x} dx \tag{18}$$

for the continuous case and $$q_n = \frac{1}{\pi} \cdot \sum_{k=-\infty}^{\infty} f_k \cdot \Theta_{n-k} \tag{19}$$

$$\Theta_k = \begin{cases} \frac{2}{k}, & k \text{ odd} \\ 0, & k \text{ even} \end{cases}$$

for the discrete case. Note that with this sign convention, when $\phi = -90°$, the constant phase rotated trace equals the Hilbert transform of the original trace.

To relate constant phase rotation to the analytic signal a(t), first note that by definition $$a(t) = f(t) + iq(t) \tag{20}$$

Let c be a complex constant given by $$c = |c| \cdot e^{i\phi} = |c| \cdot (\cos\phi + i\sin\phi) \tag{21}$$

Multiplying a(t) by c and taking the real part yields $$Re\{c \cdot a(t)\} = |c| \cdot \{\cos\phi \cdot f(t) - \sin\phi \cdot q(t)\} \tag{22}$$

Thus, multiplication of the analytic signal by a complex constant accomplishes scaling and phase rotation in one operation. Estimation of these complex constants can be formulated as a linear least squares problem with an exact solution as shown below.

Consider two real traces $f_i(t)$ and $f_j(t)$ and their corresponding analytic signals $a_i(t)$ and $a_j(t)$. Find the required amplitude, phase, and time delay by minimizing $$E_{ij} = \sum_k h_k \cdot |a_i(t_k) - c_{ij} \cdot a_j(t_k + \tau_{ij})|^2, \tag{23}$$

where $h_k$ is a temporal windowing function, usually a Hanning taper. Note that the problem is linear in $c_{ij}$ which contains the amplitude and phase adjustments. It remains nonlinear in $\tau_{ij}$, however. The principle of orthogonality in linear mean square estimation demands that $c_{ij}$ be adjusted so that the error is orthogonal to the input data, i.e., $$\sum_k h_k \cdot \{a_i(t_k) - c_{ij} \cdot a_j(t_k + \tau_{ij})\} \cdot a_j^*(t_k + \tau_{ij}) = 0, \tag{24}$$

where the symbol * is used to denote complex conjugation throughout this specification. Equation (24) may be solved exactly for the complex constant:

$$c_{ij}(\tau_{ij}) = \frac{\sum_k h_k \cdot a_i(t_k) \cdot a_j^*(t_k + \tau_{ij})}{\sum_k h_k \cdot |a_j(t_k + \tau_{ij})|^2}. \tag{25}$$

Substituting $c_{ij}(\tau_{ij})$ into Equation (23), thereby eliminating it from the problem, yields $$E_{ij} = \left\{ \sum_k h_k \cdot |a_i(t_k)|^2 \right\} \cdot \{1 - E'_{ij}\}, \tag{26}$$

$$E'_{ij} = \frac{\left| \sum_k h_k \cdot a_i(t_k) \cdot a_j^*(t_k + \tau_{ij}) \right|^2}{\sum_k h_k \cdot |a_i(t_k)|^2 \cdot \sum_k h_k \cdot |a_j(t_k + \tau_{ij})|^2}. \tag{27}$$

$E'_{ij}(\tau_{ij})$ in Equation (27) is the square of the normalized envelope of the complex cross correlation of two analytic signals and depends only on the time delay $\tau_{ij}$. Phase shift and time delay estimates have been decoupled exactly. Also observe that $$0 \leq E'_{ij} \leq 1 \tag{28}$$

Therefore, the error energy defined by Equation (26) is minimized when the normalized envelope defined by Equation (27) is maximized.

For each pair of trace gates, the normalized envelope in Equation (27) is scanned for the time delay at which its maximum value occurs. Thus, where equation (27) is maximized, the time delay between trace pairs is determined exactly. The complex constant (and thus, the phase shift) may then be computed exactly by evaluating Equation (25) at the time delay which maximized the envelope of Equation (27).

Tests have shown that for data of 8-50 Hz bandwidth sampled at 2 ms in Equation (27), the phase changes by 17° at one sample on either side of the maximum. Thus, while searching for the envelope maximum, careful interpolation between samples is a necessity. Although no complex constants or phase shifts are computed in the trace pair stage of the present invention, accurate time delays are required in the subsequent intersection computations. Hence, careful interpolation between samples cannot be avoided.

Concurrently, in a preferred embodiment, certain diagnostic functions and values are computed, displayed, and saved. For each trace pair, the normalized envelope time series defined by Equation (27) is saved and displayed. All envelope maxima are saved after conversion to a square root scale as in Equation (29). These could be displayed individually in a matrix and statistically in a histogram. Either display may be used to reject bad trace pairs.

$$Q_{ij} = \sqrt{E_{ij}(\tau_{ijmax})} \tag{29}$$

The normalized complex cross correlation defined in Equation (30), hereinafter, is computed and its real part defined in Equation (31) may be displayed on a squared scale with algebraic sign retained.

$$Z_{ij}(\tau_{ij}) = \frac{\sum_k h_k a_i(t_k) \cdot a_j^*(t_k + \tau_{ij})}{\left( \sum_k h_k \cdot |a_i(t_k)|^2 \cdot \sum_k h_k \cdot |a_j(t_k + \tau_{ij})|^2 \right)^{\frac{1}{2}}} \tag{30}$$

$$X_{ij}(\tau_{ij}) = Re\{Z_{ij}(\tau_{ij})\}. \tag{31}$$

Squaring suppresses the side lobes while accentuating the main lobe and facilitates direct comparison with the envelope. Small phase shifts are manifest on this display.

This completes the lowest level trace pair stage of the process. Saved items to be passed on to the subsequent intersections stage include 1. The set of time delays $\{\tau_{ijmax}\}$ and quality factors $\{Q_{ij}\}$, i.e., square root of envelope maxima;
2. The set of complex cross correlations appearing in the numerator of Equation (25);
3. The set of real normalization functions appearing in the denominator of Equation (25);
4. The set of real normalization constants appearing in the denominator of Equation (27).

Intersections Stage

In the intersections stage, results of the trace pair computations are combined in an optimal way to yield a phase shift, a time delay, and a quality factor for the intersection. Intersection computations are based on a linear structure, constant reflection coefficient model. Within the time gate and spatial distribution of traces, the assumption is that the reflections come from approximately plane parallel dipping layers with approximately constant reflection coefficients. Time delays $\{\tau_{ij}\}$ are indexed by trace pair to allow for structure (relative dip) near the intersection. First priority is the single time delay for the intersection.

Linear structure implies that reflection time can be expressed in x-y coordinates as $$T(x,y) = T_o + a \cdot (x - x_o) + \beta \cdot (y - y_o) \tag{32}$$

For two lines denoted by a and b, $$T_a(x,y) = T_{oa} + a \cdot (x_a - x_o) + \beta \cdot (y_a - y_o) \tag{33}$$

and $$T_b(x,y) = T_{ob} + a \cdot (x_b - x_o) + \beta \cdot (y_b - y_o) \tag{34}$$

Cross-correlation times from the trace pairs stage measure the difference between reflection times on the two lines:

$$\Delta T_{ab} = T_b(x,y) - T_a(x,y) \tag{35}$$

$$\Delta T_{ab} = T_{ob} - T_{oa} + a \cdot (x_b - x_a) + \beta \cdot (y_b - y_a) \tag{36}$$

Equation (36) may be rewritten with the trace pair index explicit:

$$\tau_{ij} = \Delta T_{ab}, \ \Delta T_o = T_{ob} - T_{oa} \tag{37}$$

$$\Delta x_{ij} = x_b - x_a, \ \Delta y_{ij} = y_b - y_a \tag{38}$$

$$\tau_{ij} = \Delta T_o + a \cdot \Delta x_{ij} + \beta \cdot \Delta y_{ij} \tag{39}$$

The required time delay between lines is the intercept $\Delta T_o$ in Equation (39). Its value is estimated by fitting a plane of the form in Equation (39) to the time delays $\{\tau_{ij}\}$. Details are given hereinafter. Note that the independent variables $\Delta x_{ij}$ and $\Delta y_{ij}$ are the differences between x- and y-coordinates for the two traces. This form allows great flexibility in the spatial distributions of the traces from the two lines. For example, lines do not have to be straight or even piecewise linear. Random distributions of points are permitted. Actual intersections need not exist. All that is required is that the linear structure approximation for the common subsurface feature be valid over the spatial distribution of traces. Note that in LINTIE, the independent variables of the planar fit are SSP numbers which contain no information about spatial location of traces.

Returning to Equation (39), the time delay, $\Delta T_o$, at the intersection between two lines is the intercept of a plane fit to the time delays for all trace pairs at the intersection. It is obtained by finding $\Delta T_o$, $a$, and $\beta$ which minimize $$E = \sum_i w_{ij} \cdot \{\tau_{ij} - \Delta T_o - a \cdot x_{ij} - \beta \cdot y_{ij}\}^2, \tag{40}$$

where $\tau_{ij}$ is the time delay for the $i^{th}$ pair, $w_{ij}$ is a weight for the $i^{th}$ pair, $\Delta T_o$ is the intercept, and $a$ and $\beta$ are the slopes. Note that the independent variables $\{x_{ij}, y_{ij}\}$ are actually the differences $\{\Delta x_{ij}, \Delta y_{ij}\}$ between x- and y-coordinates for the two traces in the $i^{th}$ pair. In addition, $w_{ij}$, the weight factor as used in this equation, has a value of 1 or 0. An 0 is assigned if the quality factor determined in Equation (29) indicates tha the data used for this trace pair is bad. A weight factor of 0 for this trace pair would eliminate the trace pair from the process. However, values other than 0 or 1 could be assigned. For example, some data may have a lower quality than other data. An interpreter may want to use the lower value data but reduce the influence of the data on the process of the invention. In another example, an interpreter may want to emphasize the traces closer to the intersection than the traces further from the intersections by the assignment of different weight factors.

Equation (40) can be rewritten (with $\Delta T_0 = T$, $\tau_{ij} = \tau_i$, $w_{ij} = w_i$, $x_{ij} = x_i$, and $y_{ij} = y_i$) in matrix form:

$$E = \tau^T W \tau + p^T Q p - p^T v - v^T p \quad (41)$$

where vectors $\tau$, p, and v are given by $$\tau = \begin{vmatrix} \tau_1 \\ \tau_2 \\ \tau_3 \\ \cdot \\ \cdot \end{vmatrix}, p = \begin{vmatrix} T \\ \alpha \\ \beta \end{vmatrix}, v = \begin{vmatrix} \sum_i w_i \tau_i \\ \sum_i w_i x_i \tau_i \\ \sum_i w_i y_i \tau_i \end{vmatrix} \quad (42)$$

and matrices Q and W are given by $$Q = \begin{vmatrix} \sum_i w_i & \sum_i w_i x_i & \sum_i w_i y_i \\ \sum_i w_i x_i & \sum_i w_i x_i^2 & \sum_i w_i x_i y_i \\ \sum_i w_i y_i & \sum_i w_i x_i y_i & \sum_i w_i y_i^2 \end{vmatrix}, \quad (43)$$

$$W = \begin{vmatrix} w_1 & 0 & 0 & \cdots \\ 0 & w_2 & 0 & \cdots \\ 0 & 0 & w_3 & \cdots \\ \cdot & \cdot & \cdot \\ \cdot & \cdot & \cdot \end{vmatrix}$$

Error energy E in Equation (41) is minimum when its gradient with respect to the unknown parameter vector p is equal to the zero vector:

$$\Delta_p E = 2Qp - 2v = 0 \quad (44)$$

which yields $$Qp = v \quad (45)$$

If the independent variables are corrected for their average values, the solution for the intercept decouples from the solution for the slopes. When the corrected variables are substituted into Equation (45), the result is $$x_i \rightarrow x_i - x, \; x = \frac{\sum_i w_i x_i}{\sum_i w_i} \quad (46)$$

$$y_i \rightarrow y_i - y, \; y = \frac{\sum_i w_i y_i}{\sum_i w_i}$$

$$T = \frac{\sum_i w_i \tau_i - \alpha \cdot \sum_i w_i x_i - \beta \cdot \sum_i w_i y_i}{\sum_i w_i} \quad (47)$$

$$Q'p' = v' \quad (48)$$

where matrix Q' is given by $$Q' = \begin{vmatrix} \sum_i w_i \cdot \sum_i w_i x_i^2 - \left(\sum_i w_i x_i\right)^2 & \sum_i w_i \cdot \sum_i w_i x_i y_i - \sum_i w_i x_i \cdot \sum_i w_i y_i \\ \sum_i w_i \cdot \sum_i w_i x_i y_i - \sum_i w_i x_i \cdot \sum_i w_i y_i & \sum_i w_i \cdot \sum_i w_i y_i^2 - \left(\sum_i w_i y_i\right)^2 \end{vmatrix} \quad (49)$$

and vectors p' and v' are given by $$p' = \begin{vmatrix} \alpha \\ \beta \end{vmatrix}, v' = \begin{vmatrix} \sum_i w_i \cdot \sum_i w_i x_i \tau_i - \sum_i w_i x_i \cdot \sum_i w_i \tau_i \\ \sum_i w_i \cdot \sum_i w_i y_i \tau_i - \sum_i w_i y_i \cdot \sum_i w_i \tau_i \end{vmatrix} \quad (50)$$

Equation (48) can be reduced to the form $$\begin{vmatrix} XX & XY \\ XY & YY \end{vmatrix} \cdot \begin{vmatrix} \alpha \\ \beta \end{vmatrix} = \begin{vmatrix} XT \\ YT \end{vmatrix} \quad (51)$$

which must be solved for $\alpha$ and $\beta$. For the case of two seismic lines intersecting at a nonzero angle, the solution is well defined. For the case of a single well-log and a perfectly straight seismic line, all data points are distributed along a line in space rather than over a plane. Hence, a solution does not exist for this case. Likewise, no solution exists for the case of two parallel seismic lines. However, a solution is possible for these configurations.

What is desired is a single, robust solution algorithm for all cases. Such an algorithm has been devised using a generalized inverse and singular value decomposition. The two eigenvalues of the matrix in Equation (51) are $$\lambda_{min} = \frac{XX + YY}{2} - \left\{ \left(\frac{XX - YY}{2}\right)^2 + (XY)^2 \right\}^{\frac{1}{2}} \quad (52)$$

$$\lambda_{max} = \frac{XX + YY}{2} + \left\{ \left(\frac{XX - YY}{2}\right)^2 + (XY)^2 \right\}^{\frac{1}{2}}$$

Rank deficiency is detected by applying a threshold test to the reciprocal of the condition number defined by $$R = \frac{\lambda_{min}}{\lambda_{max}}. \quad (53)$$

If the matrix is rank deficient, the eigenvector of the smaller eigenvalue is discarded and the solution is $$\begin{vmatrix} \alpha \\ \beta \end{vmatrix} = \frac{1}{\lambda_{max}} \cdot \left( \epsilon_{Tmax} \cdot \begin{vmatrix} XT \\ YT \end{vmatrix} \right) \cdot \epsilon_{max}. \quad (54)$$

where the eigenvector of the larger eigenvalue is given by $$\epsilon_{max} = \begin{vmatrix} \frac{\lambda_{max} - YY}{\{(\lambda_{max} - YY)^2 + (XY)^2\}^{\frac{1}{2}}} \\ \frac{XY}{\{(\lambda_{max} - YY)^2 + (XY)^2\}^{\frac{1}{2}}} \end{vmatrix} \quad (55)$$

Upon solution of Equation (47) the time delay, $\Delta T_o$ (T in Equation (47)) as well as coefficients $\alpha$ and $\beta$ are obtained from the least squares planar fit to the $\{\tau_{ij}\}$. These three parameters are then used in Equation (39) to determine a refined set of trace pair time delays $\{\hat{\tau}_{ij}\}$. Residuals in a preferred embodiment can be displayed individually in a matrix and statistically in a histogram for diagnostics. Either display may be used to reject bad trace pairs. The refined trace pair time delays $\{\hat{\tau}_{ij}\}$ are then used to estimate a single phase shift for the intersection as described below.

With time delay for the intersection in hand, phase shift can now be computed. Phase shift is obtained from the complex constant c which minimizes $$E = \sum_i \sum_j w_{ij} \sum_k h_k \cdot |a_i(t_k) - c \cdot a_j(t_k + \tau_{ij})|^2, \quad (56)$$

where $w_{ij}$ is a matrix of weights used to discount or reject bad trace pairs. Currently the weights as discussed with Equation (40) are either 0 or 1. Note that the constant c is no longer indexed by trace pair since all pairs are used to estimate a single constant for the intersection. By the principle of orthogonality, the exact solution is $$c = \frac{\sum_i \sum_j w_{ij} \sum_k h_k \cdot a_i(t_k) \cdot a_j^*(t_k + \tau_{ij})}{\sum_i \sum_j w_{ij} \sum_k h_k \cdot |a_j(t_k + \tau_{ij})|^2}. \quad (57)$$

At this point all time delays are assumed known. All that remains is to evaluate c in Equation (57) using the refined set of time delays $\{\hat{\tau}_{ij}\}$ from the planar fit. From the complex constant c, both phase shift $\phi$ and scale factor $|c|$ are calculated:

$$c = R + iX \quad (58)$$

$$\phi = \tan^{-1}\frac{X}{R} \quad (59)$$

$$|c| = \sqrt{R^2 + X^2}. \quad (60)$$

Currently no use is made of the scale factors in a preferred embodiment of this invention. Consistency for scale factors estimated from such short time gates and small ensembles is doubtful. Also, much of the data encountered may have AVC applied, however AVC will not affect the phase shift because AVC will operate on R and X approximately equally.

Finally, a quality factor for the intersection can be estimated for a preferred embodiment. First the multichannel normalized envelope is obtained by substituting c from Equation (57) into Equation (56), paralleling the development in Equations (26) and (27).

$$E' = \frac{\left|\sum_i \sum_j w_{ij} \sum_k h_k \cdot a_i(t_k) \cdot a_j^*(t_k + \tau_{ij})\right|^2}{\sum_i \sum_j w_{ij} \sum_k h_k \cdot |a_i(t_k)|^2 \cdot \sum_i \sum_j W_{ij} \sum_k h_k \cdot |a_j(t_k + \tau_{ij})|^2} \quad (61)$$

Again E' must be evaluated using the refined set of time delays $\{\hat{\tau}_{ij}\}$ from the planar fit.

As in the single channel case, $$0 \leq E' \leq 1 \quad (62)$$

Expressing the multichannel normalized envelope on a square root scale gives the desired quality factor:

$$Q = \sqrt{E'} \quad (63)$$

After all the desired intersections has been processed, phase shifts, time delays, and quality factors are passed on to the harmonization stage.

Harmonization Stage

Harmonization is the procedure by which phase shifts and time delays for the intersections are made consistent. That is, given a set of phase shifts $\{\phi_{ij}\}$ and a set of time delays $\{\tau_{ij}\}$ for a set of intersections, harmonizations finds a phase shift and time delay for each line which match the intersection values in the least square sense. Here the indexing identifies the two lines that intersect. If both $\phi_{ij}$ and $\phi_{ji}$ (as well as $\tau_{ij}$ and $\tau_{ji}$) are desired, then the intersection must be processed twice, interchanging the order of trace selection. The factors which affect phase shift may be independent of those which affect time delay. It therefore seems preferable to harmonize the two independently. In a preferred embodiment of the present invention this stage has been enhanced so that intersections may be excluded from harmonization:

1. Individually,
2. By line number,
3. By quality factor threshold, and
4. By map location.

This preferred embodiment is not available with LINTIE, although the harmonization determination is the same as that used in LINTIE. The time delay for each line is defined as that which minimizes $$E_\tau = \sum_i \sum_j w_{ij} \cdot |\tau_j - \tau_i - \tau_{ij}|^2. \quad (64)$$

where $w_{ij}$ of a preferred embodiment is a weight matrix for discounting or rejecting bad intersections. In a present embodiment the weights are either 0 or 1.

However, as discussed with Equation (40), the weights could have other values. Data from a given prospect are often diverse in origin and quality and should not be weighed equally in the harmonization. Weights could be assigned based upon the judgement of an interpreter which is guided by the quality factors determined in different stages of the process. For example, Equation (29) could be used to assign weight factors for Equation (40). Equation (40) could be used to derive different weight factors to be used with Equations (64), (65), and (66).

Additionally, in a preferred embodiment of this process, the process has the flexibility to constrain an arbitrary subset of lines and well-log synthetics during harmonization. For example, selected seismic lines may be regarded as bench marks and not allowed to shift in time during harmonization. However, well-log synthetics, preferably, should be treated as zero phase but allowed to shift in time to match migrated lines of seismic data or VSP traces.

If consistent phase shifts are desired for lines of seismic data or VSP traces, then it is possible in a preferred embodiment to constrain one subset of traces for the determination of phase shifts and another set of traces for the determination of the time shifts. This process is valid because the harmonization process assumes that the factors which affect phase shift are independent of the factors which affect time shift.

Similarly, the phase shift for each line can be defined as that which minimizes $$E_\phi = \sum_i \sum_j w_{ij} \cdot |\phi_j - \phi_i - \phi_{ij}|^2. \tag{65}$$

Phase shift for an intersection is only determined up to an additive integer multiple of $2\pi$. Hence, the objective $E\phi$ in Equation (65) must be tested for improvement by addition of multiples of $2\pi$ to the intersection estimates. This procedure is slowly convergent. To remedy this, the phase shift for each line can be found by the nonlinear minimization of $$E_\phi = \sum_i \sum_j w_{ij} \cdot \sin^2\left(\frac{\phi_j - \phi_i - \phi_{ij}}{2}\right), \tag{66}$$

using a conjugate gradient algorithm.

Spectral Matching

Implicit in the LINTIE model is the assumption of equal amplitude spectra for the two lines. However, LINTIE has no spectral matching provision. In a preferred embodiment, a spectral matching capability is provided. The addition of this stage to the invention of this specification provides for a simple and effective spectral matching. Amplitude spectra are matched at an inter-section by finding filters $F(f)$ and $G(f)$ which minimize $$E = \sum_i \sum_j w_{ij} \cdot |F(f) \cdot A_i(f) - G(f) \cdot B_j(f)|^2 - \tag{67}$$

$$\lambda \cdot \{|F(f)|^2 + |G(f)|^2 - C^2(f)\},$$

where $\{A_i(f)\}$ and $\{B_j(f)\}$ are sets of complex spectra from the two lines. To avoid the zero solution, a constraint on the sum of squares of the filter amplitudes has been appended with Lagrangian multiplier $\lambda$. Note that $F(f)$ and $G(f)$ are not indexed by trace number since a single filter is desired for each line. Filters are computed by solving Equation (67) at the desired discrete frequencies.

At this point, the input spectra $A_i(f)$ and $B_j(f)$ are complex. Therefore, if Equation (67) is solved as it stands for $F(f)$ and $G(f)$, they too will be complex. Only real filters are permissible, however. Equation (67) can be rewritten as $$E = V^{*T}MV - \lambda \cdot \{V^{*T}V - C^2\} \tag{68}$$

where M is the 2×2 complex Hermitian matrix $$M = \begin{bmatrix} \sum_i \sum_j w_{ij} \cdot |A_i|^2 & -\sum_i \sum_j w_{ij} \cdot A_i^* B_j \\ -\sum_i \sum_j w_{ij} \cdot A_i B_j^* & \sum_i \sum_j w_{ij} \cdot |B_j|^2 \end{bmatrix} \tag{69}$$

and the desired solution filter vector is $$V = \begin{bmatrix} F \\ G \end{bmatrix} \tag{70}$$

At an extremum, the gradient of E with respect to the filter vector V must equal the zero vector:

$$\Delta_v E = 2MV - 2\lambda V = 0 \tag{71}$$

which leads to the complex eigenvalue problem defined by $$MV = \lambda V \tag{72}$$

and $$\lambda = \frac{V^{*T}MV}{V^{*T}V} = \frac{V^{*T}MV}{C^2}. \tag{73}$$

Hence, the solution is the eigenvector corresponding to the minimum eigenvalue of M. Matrix M in Equation (69) can be rewritten in the compact form $$M = \begin{bmatrix} m_{11} & -m_{12} \\ -m_{12}^* & m_{22} \end{bmatrix} \tag{74}$$

where $$m_{11} = \sum_i \sum_j w_{ij} \cdot |A_i|^2, \; m_{22} = \sum_i \sum_j w_{ij} \cdot |B_j|^2, \tag{75}$$

$$m_{12} = \sum_i \sum_j w_{ij} \cdot A_i^* \cdot B_j$$

Real filters can be obtained by forcing the off-diagonal terms $-m_{12}$ and $-m^*_{12}$ to be real. Only real filters are permissible since phase shifts are estimated in the intersection stage. This can be accomplished in two ways:

$$|m_{12}| = \sum_i \sum_j w_{ij} \cdot |A_i^* \cdot B_j| \tag{76}$$

or $$|m_{12}| = \left| \sum_i \sum_j w_{ij} \cdot A_i^* \cdot B_j \right| \tag{77}$$

The filter obtained from Equation (76) is computed from power spectra only and matches signal power plus noise power. It is designated in a preferred embodiment as the incoherent filter. However, the filter obtained from Equation (77) is computed from both power-spectra and cross-spectra. It balances signal amplitude equalization with noise power suppression. In a preferred embodiment it is designated as the coherent filter. The equation requires that the cross-spectra must be aligned and stacked to compute the coherent filter. An initial pass through the trace pair and intersection stage is required first to obtain a set of time delays for stacking the cross-spectra of the traces.

The general solution of Equation (72) for either filter is given by $$F = \frac{C \cdot |m_{12}|}{\{(m_{11} - \lambda)^2 + |m_{12}|^2\}^{\frac{1}{2}}} \quad (78)$$

$$G = \frac{C \cdot (m_{11} - \lambda)}{\{(m_{11} - \lambda)^2 + |m_{12}|^2\}^{\frac{1}{2}}} \quad (79)$$

where $$m_{11} - \lambda = \frac{m_{11} - m_{22}}{2} + \left\{ \left( \frac{m_{11} - m_{22}}{2} \right)^2 + |m_{12}|^2 \right\}^{\frac{1}{2}}. \quad (80)$$

Suppose that the frequency-dependent constraint C(f) equals unity for all frequencies. This prevents sufficient noise suppression at noise-dominated frequencies. Potentially more useful should be constraints which decrease with signal-to-noise ratio. One such constraint is the magnitude squared coherence, an estimate of which is $$\gamma^2(f) = \frac{\left| \sum_i \sum_j w_{ij} \cdot A_i^* \cdot B_j \right|^2}{\sum_i \sum_j w_{ij} \cdot |A_i|^2 \cdot \sum_i \sum_j w_{ij} \cdot |B_j|^2} \quad (81)$$

where $$0 \leq \gamma^2(f) \leq 1 \quad (82)$$

Both filter gains are reduced in regions of the spectrum where coherence is low.

Two solution models have been derived which yield real filters, i.e. a coherent filter (Equation (77)) and incoherent filter (Equation (76)).

Only power spectra are used to determine the simpler incoherent filters which essentially match signal power plus noise for the two sets of data within the time gate. These filters can be determined at the trace pairs stage after the time gate length is determined (to be discussed hereinafter). One filter is determined for the trace gates from one line of data and another filter is determined for the trace gates from the other line. After the incoherent filters are obtained the filters then operate on the trace gates from each line of data to match the amplitude spectra. The trace gates adjusted by the filters then replace the previous trace gates and are then processed through the three stages to completion.

Cross-spectra are introduced in the computation of the more complicated coherent filters. The cross spectra for each trace pair within the time gate is first determined. However, the cross-spectra must be aligned and stacked to compute the coherent filters (Equation (77)). This requires that time delays be known. To obtain the time delays necessary to determine each filter, an initial pass through the trace pair and intersection stage is made to obtain a time delay at the intersection for stacking cross-spectra. With the time delay at the intersection known, refined time delays between trace pairs are also known. The cross-spectra of the trace gates are stacked using the refined time delays, the resulting cross-spectrum is then used to determine the coherent filter for the trace gates from each line of data (Equations (78) and (79)). A coherent filter is determined for the trace gates which came from each line. The coherent filters then operate upon their respective trace gates to match the amplitude spectra of the trace gates. The adjusted trace gates then replace the original trace gates.

With the addition of cross-spectra information, the coherent filter can balance signal equalization with noise suppression. However, the significant gain in filter performance of the coherent filter over the incoherent filter must be weighed against the cost of the extra pass through the trace pairs and intersection stages for each intersection.

In a preferred embodiment, the filters are unique to each intersection and are discarded after spectral matching.

Illustrative Embodiments

To illustrate the application of the methods of the preferred embodiments and to show some of the diagnostics which may be generated, the basic steps of the method of the preferred embodiments are provided in FIG. 2. FIG. 2 is a flow diagram which shows that the method involves acquiring sets of data where a subsurface feature is to be made consistent, 10. Initially an intersection and two sets of data are selected, 12. In the pairs stage, 14, representative traces are selected from the two sets of data and paired. A time gate is selected which isolates trace gates that encompass a subsurface feature of interest. The trace gates are then processed through the pairs stage to determine a time delay for each trace pair. At the end of the intersection stage, 16, a phase shift and a time delay has been determined for that intersection. Another intersection is chosen and two sets of data are selected. This could involve different sets of data or it could include one of the previous sets of data or both sets (provided a different intersection is chosen or the sets of data are interchanged). The process is repeated until representative traces near the intersections from all sets of data and all desired intersections have been processed through the intersection stage. The process then goes to the harmonization stage, 18, where a time delay and a phase shift are determined for each set of data. The values determined in the harmonization stage can then be used to construct a filter, as is known in the art, for applying the determined values to the traces in each set of data to adjust, i.e., calibrate, all of the traces to be consistent about the common subsurface feature at the intersections.

The entire length of the trace may or may not be consistent near the intersection, but in the vicinity of the subsurface feature of interest on the seismic traces, the traces are consistent, i.e., no mistie due to disparate processing and acquisition, because only the area around and including the subsurface feature is used in the processing of the preferred embodiments of this invention to obtain a phase shift and time delay for each set of data which is specific to the subsurface feature. Each set of data has been adjusted such that misties between the sets of data about the common subsurface feature at the intersections have been reduced. If an interpreter wants to make some other subsurface feature consistent near the intersections, the process must be repeated, i.e. the other feature must be specifically identified and processed to ensure consistency of that subsurface feature between different sets of data near the intersections.

The method of the preferred embodiments can also provide trace calibration between sets of data, i.e. groups of seismic traces acquired by different acquisition techniques. Trace calibration is used herein in the general sense to render traces alike in some way, i.e. to have correspondence between the groups of traces. The method of this invention determines a correspondence between groups of traces by determining a transformation between the isolated reflections representing a common subsurface feature. Since the traces are subject to approximately the same subsurface environment, the differences between the traces, i.e. the transformation, can be considered to be a result of different acquisition and processing techniques. The values for the transformation determined by this invention can then be used on their respective trace groups to provide trace calibration of the traces.

These illustrative embodiments will show how the methods of the preferred embodiments work with lines of seismic data, however the FIGS. provided of the flow charts of this process apply to sets of data, i.e. groups of seismic traces, since the process is not limited to lines of seismic data. It can also be used on isolated seismic traces such as vertical seismic profiles (VSP) or well log synthetic traces. These isolated seismic traces can be processed alone as a set of data or joined together into a single set of data; provided the origins and the processing of the isolated traces are similar.

The use of the various preferred embodiments of the invention in adjusting VSP and well-log synthetics data, i.e., isolated traces, will depend largely upon how the data was originally acquired and processed. Time delay and phase shift between sets of data are not just affected by different types of instrumentation used, but also by the types of sources used to generate the seismic signal, the ground environment where the data was acquired, and subsequent processing techniques.

For example, if several VSPs are available that were acquired using the same type of source and underwent the same processing techniques, then all of the VSP data might be treated as one set of data. Since the process recognizes the spacial location of the VSP traces in an x-y coordinate system, the VSP data could be considered a random line of seismic data. However, if the VSP data is dissimilar then each VSP trace should be treated as one set of data.

Well-log synthetics are not a true seismic trace produced by a seismic source. The well-log synthetic is derived from well-log data. Various processes may be used to produce the well-log synthetic trace. However the trace is derived, the synthetic trace will normally have zero phase shift. Since well-log synthetics are artificial and the phase relationship for all can be derived to be zero phase, it is not necessary to use the process of this invention to adjust phase misties between well-log synthetics. However, the process of this invention can be used to adjust well-log synthetics as a set of data to VSP data or to lines of data, having in mind that the well-log synthetics should remain at zero phase through the entire process. In a preferred embodiment of the harmonization stage, it is possible to maintain the well-synthetic trace data set with zero phase and to harmonize the phase shifts of the other sets of data to the zero phase of the well-log synthetic data set.

In this specification, as mentioned heretofore, a VSP trace and a well-log synthetic trace can be considered as having the same characteristics (except for the limitation discussed for the zero phase of a well-log synthetic trace) as seismic traces in lines of seismic data and the term seismic trace includes VSP traces and well-log synthetic traces in this specification.

Figure 4:
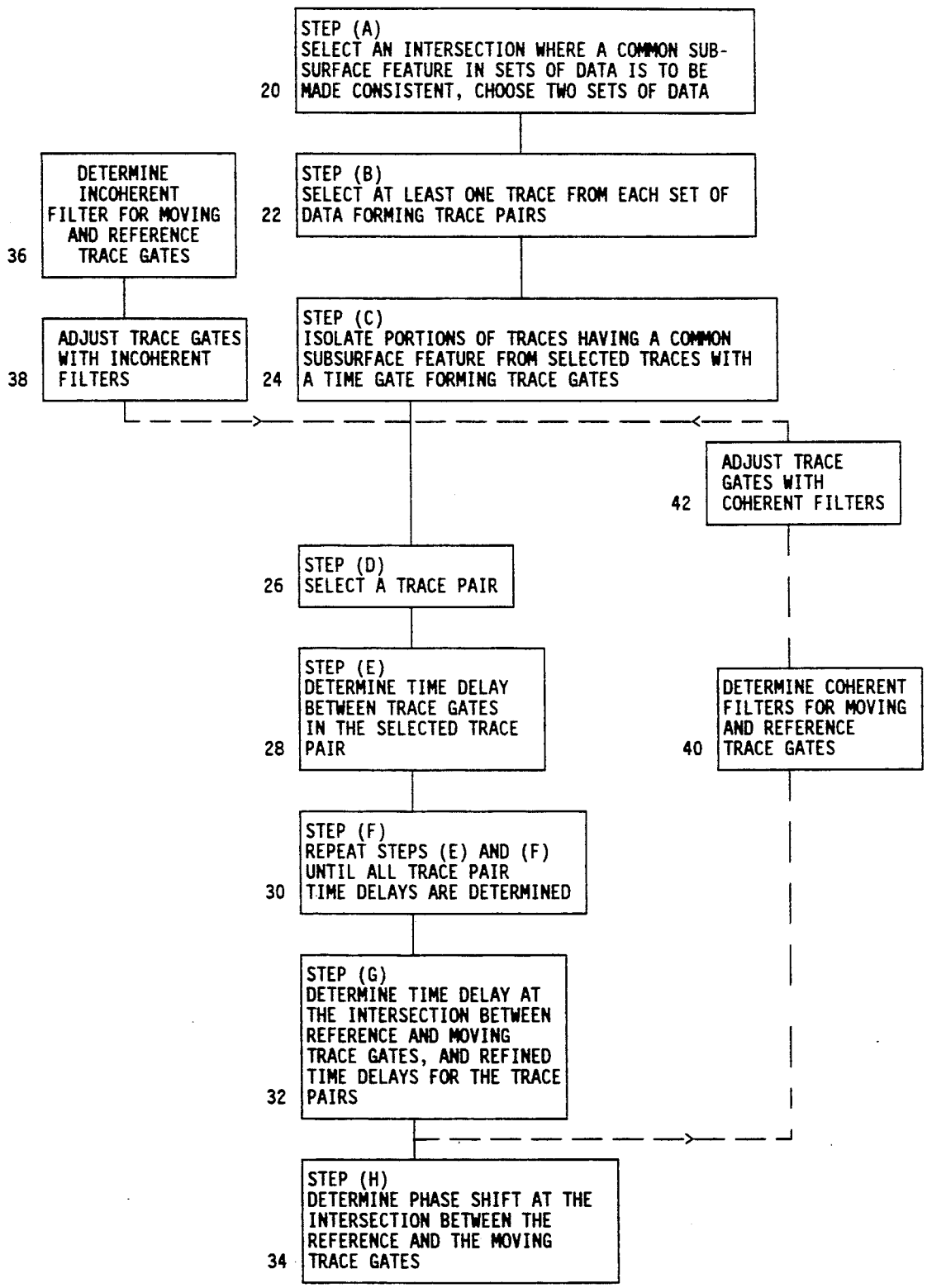
FIG. 4 depicts a flow chart of the pairs and intersection stages.
Figure 5:
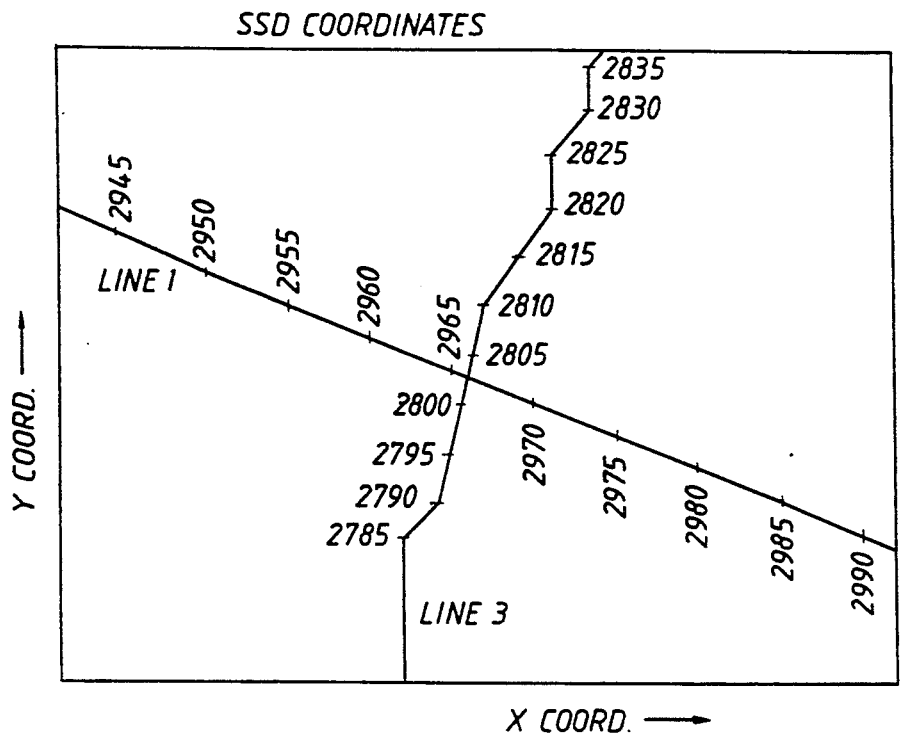
FIG. 5 depicts a blow-up of an intersection displayed in FIG. 3.

Returning to this illustrative embodiment and referring now to FIG. 3, a preferred embodiment provides a simulated map of lines of seismic data intersecting in an x-y coordinate system. The sets of data (groups of seismic traces) in these illustrative embodiments will be lines of seismic data. The interpreter selects an intersection and two lines of seismic data to process. In a preferred embodiment, if lines of seismic data intersect, the intersecting lines will be automatically selected. This is step (a), 20 of FIG. 4. FIG. 4 is a more detailed block diagram of the pairs and intersection stage of a preferred embodiment of this invention than FIG. 2 and encompasses blocks 12, 14, and 16 of that FIG. In a preferred embodiment after the intersection is selected, the selected intersection of FIG. 3 can be blown up as shown in FIG. 5 to show the traces and their locations nearest the chosen intersection. Note also in FIG. 5, SSP numbers are also provided in a preferred embodiment to specifically identify traces. In this illustrative embodiment the interpreter has chosen to work with the intersection of lines 1 and 3, however if isolated traces or parallel lines of seismic data are involved the interpreter would identify the intersection point in this step of the process and the two sets of data.

The method of this invention uses the specific trace location in relation to the intersection rather than just the SSP identification number to the trace. Because the traces are specifically located, in a preferred embodiment, as shown in FIG. 5, the interpreter is provided with an illustration of how the traces correspond to traces in other lines of data as an aid in selecting which traces to use in the pairs and intersection stage out of possibly hundreds of traces in each line of seismic data.

The next step, step (b), 22 of FIG. 4 is to select traces from the lines of seismic data. In a preferred embodiment, the traces nearest the intersection (the number of traces is arbitrary) can be automatically paired with traces from the opposite line forming a set of trace pairs. In a preferred embodiment, the 20 nearest traces at the intersection from each line of seismic data can be paired thus forming a set of 400 trace pairs. Each selected trace from one line is paired with all of the selected traces from the other line. It is also possible in a preferred embodiment to individually select the trace pairs. At least one trace must be selected from each line, preferably more than one representative trace from each line should be selected to provide a statically meaningful sample. In addition, at this step the selected traces, depending upon the line from which they were selected, will be designated as either reference or moving traces. In a preferred embodiment, it is possible for the designation of reference and moving traces to be done automatically or manually so that the reference and moving traces can be interchanged as a check on the results of this process.

In the next step, step (c), 24, of FIG. 4, the interpreter will examine the selected traces for a common subsurface feature of interest which is to be made consistent at the intersection of the lines of seismic data. To identify the subsurface feature for processing from the rest of the trace, a time gate is used. Since traces are time varying signals, a time gate represents a length of time. The length of the time gate can be selected in this step in a preferred embodiment. The position of the time gate can be varied up and down the selected traces so that the time gate can be located over the reflections representative of the subsurface feature of interest on the traces.

The interpreter will examine the selected reference traces for a reflection or reflections which are representative of the subsurface feature of interest and select a time gate length which will encompass the subsurface feature for all displayed reference traces. The time gate will be the same for all of the reference traces. This means that if there is observed dip on the reference traces the reflections representative of the subsurface feature of interest could be at slightly different locations within the time gate. The portion of reference trace within the time gate will be then isolated from the rest of the reference traces for processing purposes after the time gate position is selected forming a trace gate.

The interpreter then examines the selected moving traces and moves the time gate up or down to encompass the reflections which are representative of the common subsurface feature of interest. The length of the time gate selected for the reference traces will determine the time gate length for the moving traces. However in the trace pairs stage, the time gate length needs to be slightly longer; consequently the trace gate isolated by the time gate will be slightly longer. This is to allow the moving trace gates to move with respect to the reference trace gates in the cross-correlations that are performed in the processing of this invention. Since the moving trace gates are slightly longer in the processing, it is possible to interchange the reference and moving traces and obtain slightly different results. This can be used as a check on the process, for example, if the results after interchanging the traces are significantly different, it is possible that either the time gate length selected was not long enough or a common feature of interest was not on both groups of representative traces.

Figure 6:
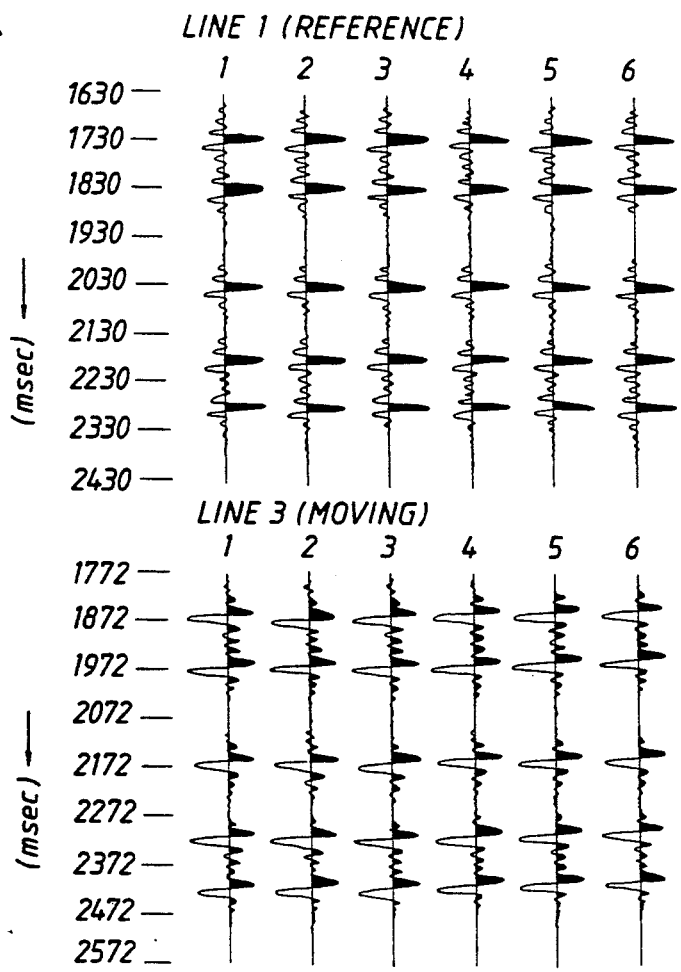
FIG. 6 depicts a display of trace gates from lines of seismic data isolated by the time gates.

FIG. 6 provides a display of what an interpreter would observe after he has completed this step, step (c). In this illustrative embodiment, only 6 representative traces have been selected from each line. Traces from line 1 are the reference traces and the moving traces are from line 3. The interpreter has determined that a time gate length of 800 milliseconds will adequately encompass the subsurface feature of interest. In a preferred embodiment, the center of the time gate can be highlighted (not shown in FIG. 6). The interpreter could then place the highlighted center over or near the reflection or reflections which are representative of the subsurface feature of interest, which in this case is a reflection at approximately 2030 milliseconds from the reference time datum. Due to dip, this subsurface feature may not be at specifically the same location on all of the representative reference traces, consequently the interpreter, preferably will center the time gate to place the subsurface feature as close as possible to the center of time gate for all representative traces. In addition, the interpreter could increase the length of the time gate to ensure that the subsurface feature is within the time gate for all reference traces. The interpreter will then go through the same process for the moving traces, in this case the common subsurface feature of interest is located at approximately 2172 milliseconds from the reference time datum and is centered in the time gate. After the interpreter has determined the proper location of the time gate over the representative moving traces, data within the time gate are extracted from the traces forming trace gates; thus the set of trace pairs now contains only the data within the time gates. In this example, since there are 6 representative traces from each line and we have chosen to use an embodiment that pairs each representative trace with all the representative traces from the other line, the set of trace pairs contains 36 pairs of trace gates.

After step (c), in a preferred embodiment, it is possible to perform spectral matching using an incoherent filter (to be discussed hereinafter).

The next step, step (d) of FIG. 4, 26, is to select a trace pair to be processed to determine the time delay of the trace pair ($\tau_{ijmax}$). The envelope of the squared normalized cross-correlation of the trace pair is scanned using Equation (27).

The interpreter then determines from the maximum of the envelope the time delay (also called a time shift), step (e), 28 of FIG. 6. This value is saved.

In a preferred embodiment, during the processing of step (e), additional values are determined and saved at this point for later processing steps and for diagnostic purposes. For example, the quality factor ($Q_{ij}$) from Equation (29) is used to help the interpreter determine if a trace contains bad data. In addition, a squared display of the real portion of the normalized cross-correlation ($x_{ij}(\tau_{ij})$) from Equation (31) is used by the interpreter as a check on the quality factor and to help the interpreter determine if the time gate is long enough. If the displayed cross-spectra is noisy or does not have a well defined peak, the time gate may not be long enough.

After the time delay is determined for a trace pair, steps (d) and (e) are repeated for all remaining trace pairs (step (f) on FIG. 4, 30).

When the before-mentioned values have been determined, in a preferred embodiment, the interpreter can observe the results of the cross-correlations of the trace pairs and decide if some representative traces should be removed and if the selected time gate length provides unambiguous results.

The next step, step (g) of FIG. 4, 32, begins the intersection stage. This step determines a single time delay at the selected intersection between the reference and moving trace gates from the time delays for the trace pairs.

During the intersection stage, step (h), 32 of FIG. 4, the specific location with respect to the intersection of each trace used in a trace pair is considered in the processing using an x-y coordinate system. The time delay for the intersection is determined by a least-squares planar fit to the time delays obtained during the pairs stage, 30 and 32 of FIG. 4, and the spatial distribution of the traces in the x-y coordinate system. A single time delay ($\Delta T_o$) is determined for the intersection. The intersection time delay and the two components of dip from the planar fit are used to determine refined individual trace pair time delays ($\hat{\tau}_{ij}$).

In a preferred embodiment, additional diagnostics are provided at this point so the interpreter can evaluate the process to determine if traces containing bad data have been included. When the refined time delays ($\hat{\tau}_{ij}$) are calculated, the residuals from the plane can be displayed to provide the interpreter with an indication of how well the individual trace pair time delays match the refined time delays determined by the processing at this point. The residuals for each trace pair can be used by the interpreter to determine if a trace pair or a trace should be removed from the process. If a trace pair or a trace is eliminated at this point, preferably the processing should be started again at the trace pairs stage.

After this step, 32 of FIG. 4, spectral matching by a coherent filter (to be discussed hereinafter) may be performed to improve the results of the overall process.

After the refined time delays ($\hat{\tau}_{ij}$) for each trace pair are determined, the phase shift ($\phi$) for the intersection, i.e. the phase shift at the intersection between the reference and moving trace gates is determined from the refined time delays, step (h), 34 of FIG. 4.

In a preferred embodiment, a quality factor for the intersection can be determined at this point, to aid the interpreter so that he can compare the results of the processing on this intersection with other processed intersections.

At the completion of the intersection stage for the specified intersection, additional intersections may then be processed. Returning to FIG. 2, the block diagram shows that blocks 12, 14, and 16 may be repeated to process all sets of data and all desired intersections. However, if only two lines of seismic data are to be processed, the values obtained can be used to adjust all of the traces in lines of seismic data which was used to supply the representative moving traces so that the traces in both lines will be consistent around the subsurface feature of interest at the intersection.

For diagnostic purposes at the end of the intersection stage, in a preferred embodiment, the moving trace gates are adjusted by the values obtained and displayed so the interpreter can evaluate the results of the process.

In addition, even though only two lines of seismic data may have been processed with only one intersection solution, the process can be continued into the harmonization stage (to be discussed hereinafter) where the values obtained in the intersection stage will be harmonized between the two lines of seismic data. The values obtained can then be applied to adjust the traces of both lines of seismic data.

After all of the intersections have been processed, the time delay $\Delta T_o$, and phase shift $\phi$ for each intersection is then passed to the harmonization stage, 18 of FIG. 2.

In the harmonization stage of a preferred embodiment, a time delay and a phase shift are determined for each line by a least-square-fit over all of the intersections. The time delay and the phase shift can then be applied to the individual traces from the lines of seismic data to adjust, i.e. to calibrate the entire traces. The traces in the lines of seismic data are by this process made consistent about the subsurface feature of interest at the intersections.

In the harmonization stage of a preferred embodiment, the interpreter has the option to exclude certain sets of data from harmonization. In addition, the interpreter may choose to maintain a specific line of data, well-log synthetic, or vertical seismic profile as a reference for either the phase shift or time delay or both.

In a preferred embodiment after a time gate has been determined, 24 of FIG. 4, spectral matching can be performed using an incoherent filter. An incoherent filter is determined for the trace gates from each line of seismic data, i.e., a filter for the reference trace gates and a filter for the moving trace gates. The filters are determined from the spectra of trace pairs, 36 of FIG. 4. The respective filter then adjusts its trace gates to provide spectral matching, 38 of FIG. 4, and the process then continues at step (d), 26 of FIG. 4, with the spectrally matched trace gates.

The use of a coherent filter could improve the amplitude spectral match because the addition of stacked cross-spectra in the process would reduce noise power on the traces. To determine accurate cross-spectral values, the cross-spectra of the trace pairs must be time aligned before stacking. However, at this point in the processing (step (c)), 24 time delays have not been determined; therefore the coherent filter for each line cannot be determined.

When the intersection time delay, ($T_o$), and the refined time delays ($\hat{\tau}_{ij}$) have been determined, step (g), 32 of FIG. 4, the refined time delays for each trace pair can then be used to stack the cross-spectra. A coherent filter for the reference trace gates and a coherent filter for the moving trace gates can then be determined, 40 of FIG. 4. The trace gates are then adjusted by their respective coherent filters, 42 of FIG. 4, and the processing starts again at step (d), 26 of FIG. 4.

Figure 7:
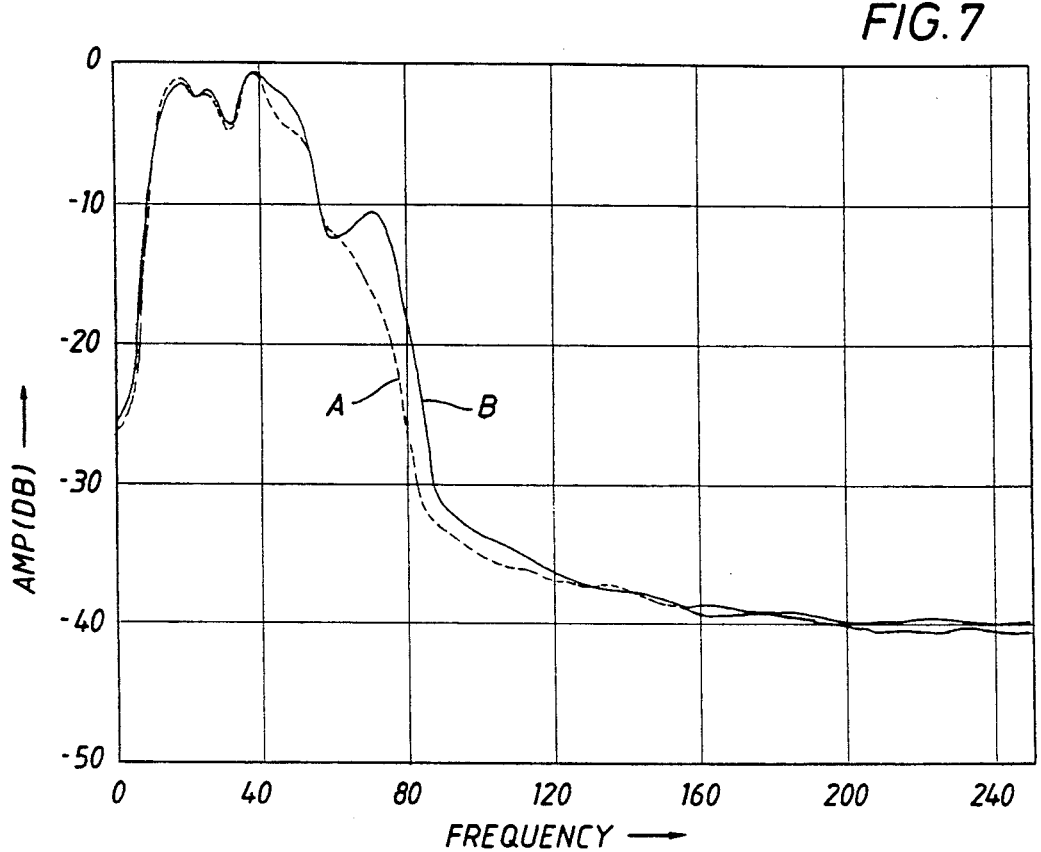
FIG. 7 shows the amplitude spectra of trace gates from different lines of data before spectral equalization.

To show the benefits of the use of coherent filters in the preferred embodiments of this process, several FIGS. are provided. In FIG. 7 the power spectra of two trace gates, A and B, are compared before amplitude spectra equalization. FIG. 7 shows that the power spectrum of both trace gates have components above a frequency of 80 cycles/second. This is noise, and noise could also be contributing to the power spectra of the traces below 80 cycles, but it is not graphically apparent on FIG. 7. Additionally trace B exhibits a peak around a frequency of 80 cycles/second which could be due to noise, but could also be due to different processing and acquistion techniques used for this line of seismic data.

Figure 8:
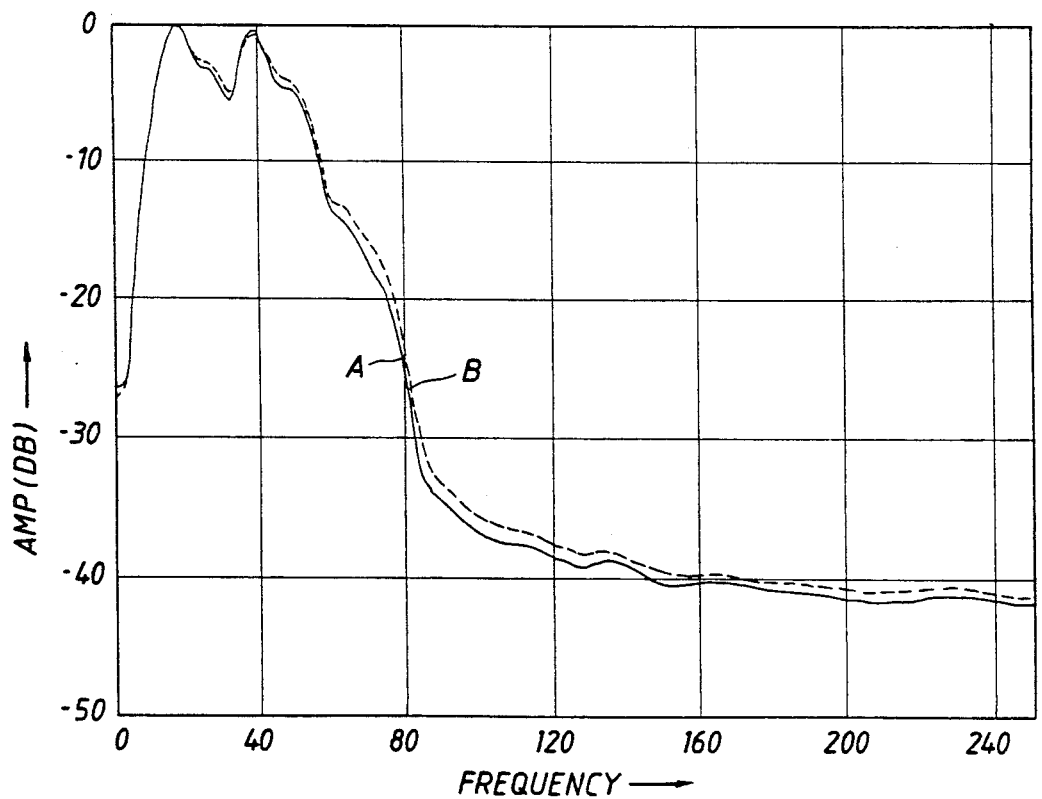
FIG. 8 shows the amplitude spectra of the trace gates from FIG. 6 after spectral equalization using an incoherent filter.

FIG. 8 shows the same trace gates, A and B, compared after incoherent filter equalization of the traces (Equation (76), then Equations (78) and (79)). However, as mentioned, incoherent filters match signal power plus noise power. FIG. 8 shows that the peak around 80 cycles has been attenuated because the power spectra of the two traces have been matched, but there is still significant noise contribution in the trace gates as can be seen by the power spectra above 80 cycles.

Figure 9:
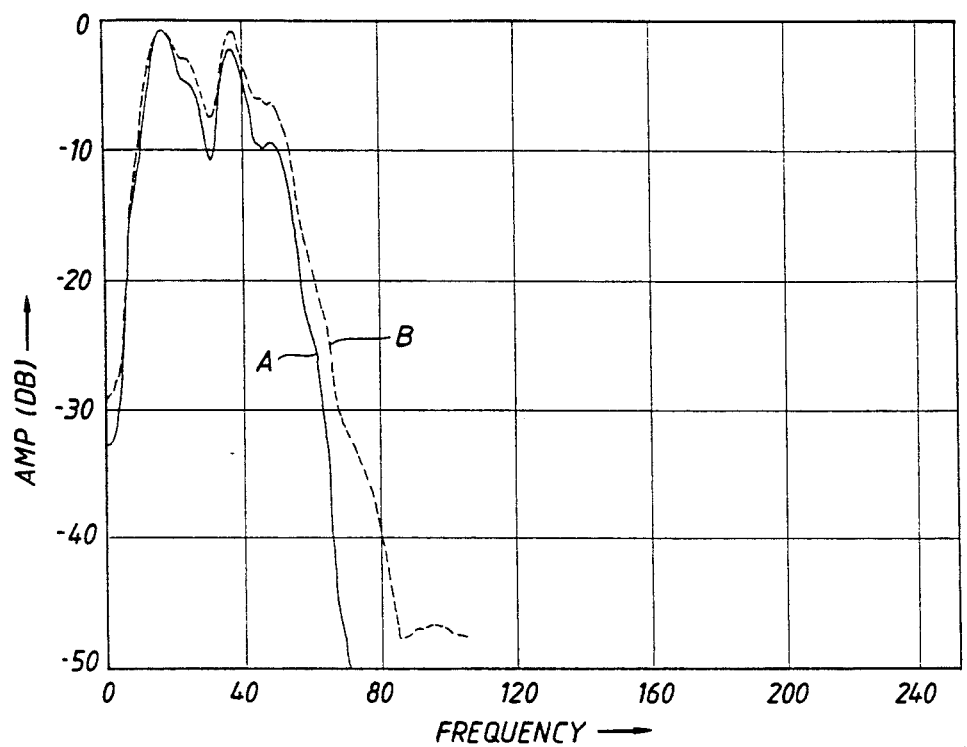
FIG. 9 shows the amplitude spectra of the trace gates from FIG. 6 after spectral equalization using a coherent filter.

FIG. 9 shows the same traces, A and B, compared after coherent filters match signal amplitude while suppressing uncorrelated noise power (Equation (77), then Equations (78) and (79)). The power spectra above 80 cycles exhibits little or no power spectra components; in addition the peaks of both power spectra are much better defined. Although the use of incoherent filters can provide spectral matching which can improve the results of the trace pairs stage, the use of coherent filters should provide a more significant improvement in the trace pairs stage when data sets were acquired and processed by different techniques. However, the use of coherent filters will increase the time necessary to arrive at values for adjusting the traces.

In a preferred embodiment, at the completion of any stage, it is preferable that a direct comparison between trace gates be made by the interpreter to see the results of the processing. Of particular importance to the interpreter is the comparison of traces near an intersection. Diagnostics have been provided in certain preferred embodiments to allow these comparisons.

Figure 10:
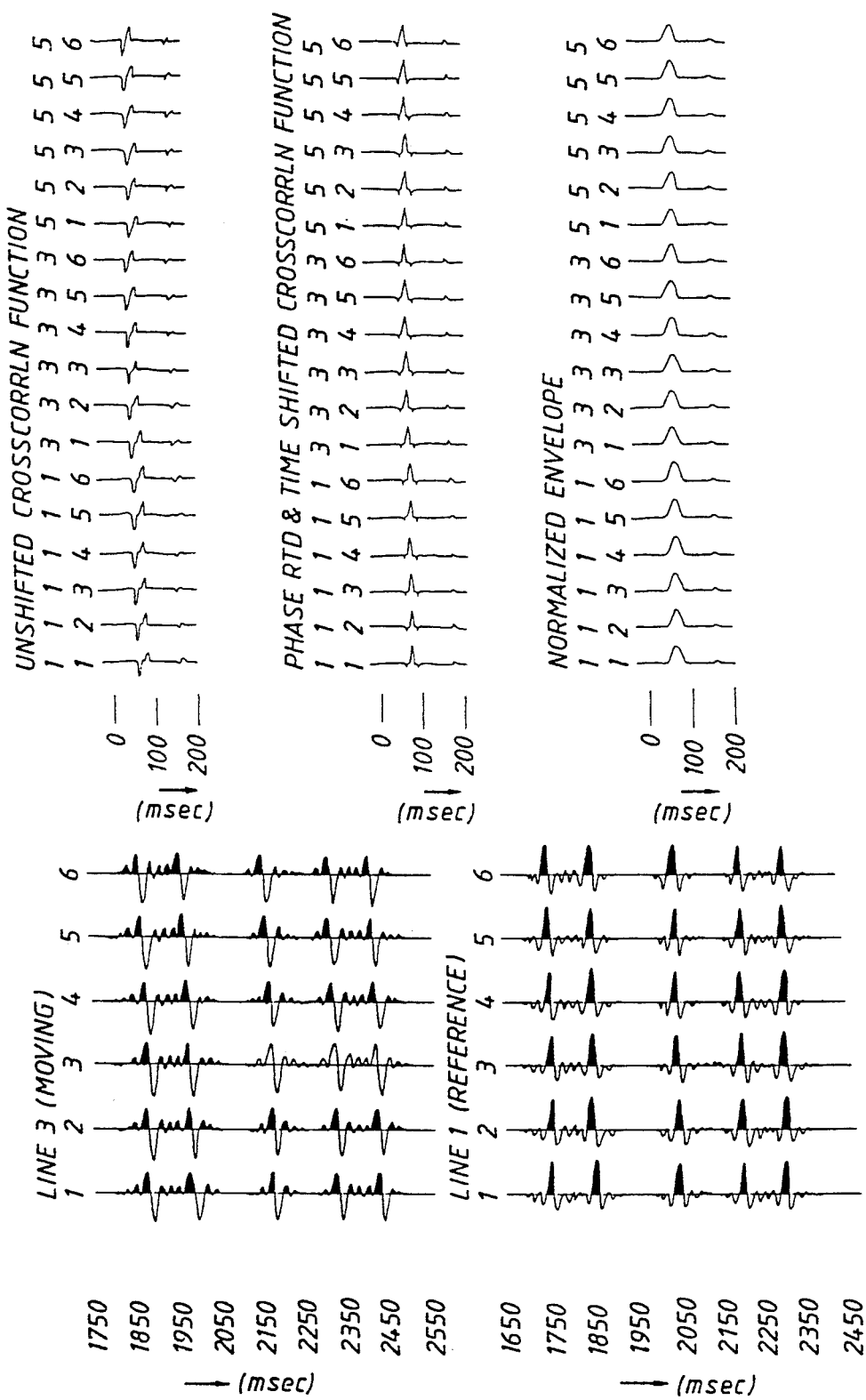
FIG. 10 depicts a display of diagnostics available to an interpreter to evaluate certain steps of this invention.

As an example, FIG. 10 shows the reference trace gates (called the reference line (line 1)) and the moving trace gates (called the moving line (line 3)) nearest a selected intersection. FIG. 10 shows that in a preferred embodiment the interpreter has available certain diagnostics which allow him to evaluate the success of the process. Line 3 is shown uncalibrated; however FIG. 10 also shows a display of the initial determination of the real part of the normalized complex cross-correlation (Equation (31)) on a squared scale for individual trace pairs prior to the start of step (e), 28 of FIG. 4, called the "unshifted crosscorrln function" on FIG. 10. The trace pairs are uniquely identified by reference trace number (top) and the moving trace number (bottom). A similar display is also provided of the same function after the phase shift and time shift determined in steps (g), 32, and (h), 34, of FIG. 4 are applied to the "moving" traces. This is called the "Phase RTD & Time Shifted Crosscorrln Function" on FIG. 10. The comparison of these cross correlation displays will provided a good indication of the success of the process at the intersection stage since the cross-correlations show how well the moving trace gates have been adjusted so that they match the reference trace gates. An additional similar display is provided of the "normalized envelope" of the cross-correlation of the trace pairs (Equation 29). The higher the value of the envelope maximum the better quality of fit the trace pair has in the determination of the time delay. Using the diagnostics of FIG. 10, the interpreter can determine which traces contain bad data by a process of elimination or if the results displayed are ambiguous the interpreter can determine if a long enough time gate was chosen for the process or if the time gate was not centered properly over the moving or reference traces.

Figure 11:
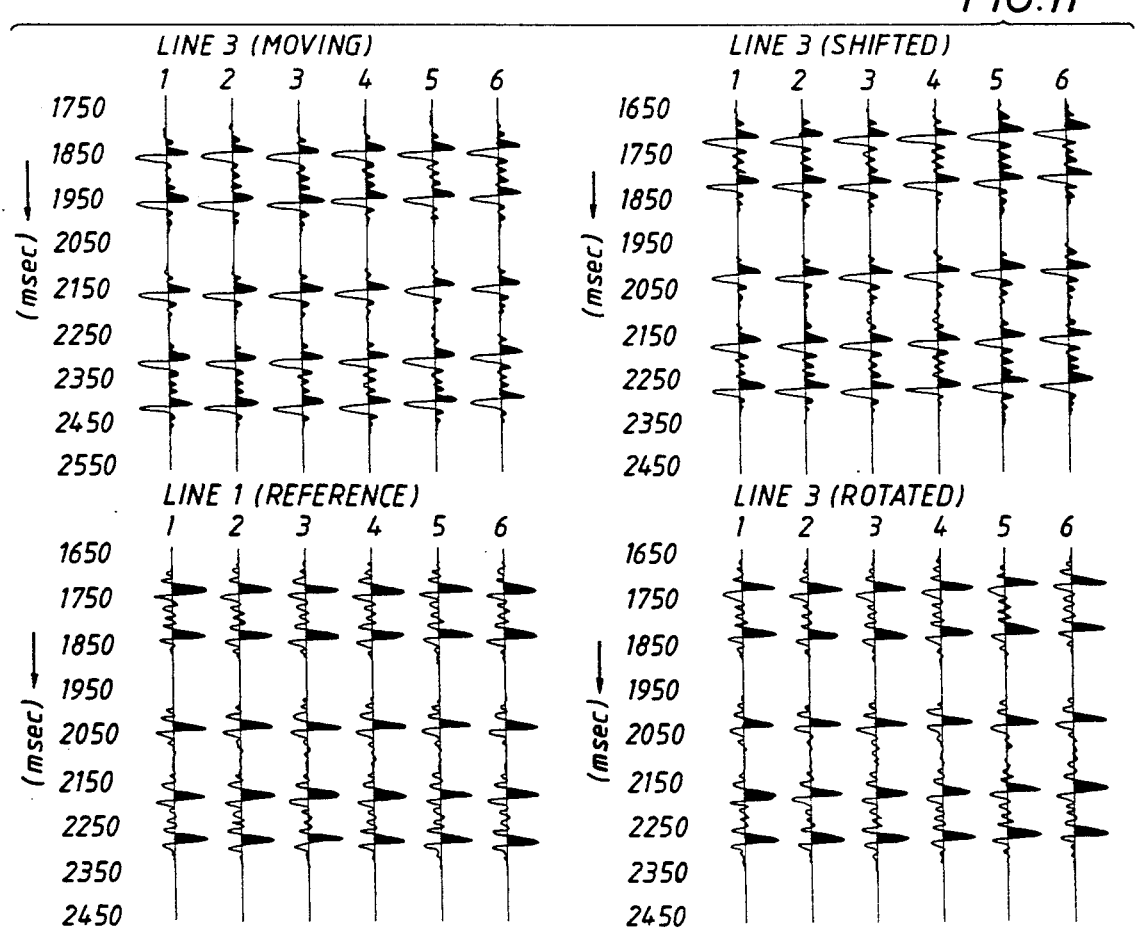
FIG. 11 depicts a display showing the moving and reference trace gates with moving trace gates in their initial state, after time shifting, and after time and phase shifting.

FIG. 11 provides an additional display to the interpreter which shows the reference trace gates for time shift, the initial moving trace gates, the adjusted moving trace gates, and the moving trace gates (called rotated on FIG. 11) after the phase shift and time shift determined in the intersection stage have been applied.

In addition, in a preferred embodiment, the interpreter is provided an analysis of the harmonization results. As shown in TABLE 1, the results provide a listing of the phase and time shifts for each line. It also displays the harmonization results with respect to the time shift and phase shift determined at each intersection in the intersection stage.

TABLE 1

| HARMONIZATION RESULTS FOR INDIVIDUAL LINES | | |
|---|---|---|
| LINE | PHASE | TIME SHIFT |
| 80-DIG-026 | −18.82 | −8.42 |
| 79-DIG-001E | −1.45 | −3.82 |
| 79-DIG-024 | −1.79 | −2.89 |
| 82-SRE-143 | 24.67 | −1.06 |
| 80-SRE-103 | −4.07 | 18.82 |
| 80-SRE-112C3 | −22.46 | −2.62 |

| HARMONIZATION RESULTS FOR INTERSECTIONS | | | | | | | |
|---|---|---|---|---|---|---|---|
| | | PHASE SHIFT | | | TIME SHIFT | | |
| REFERENCE | MOVING | INTER | HARM | DIFF | INTER | HARM | DIFF |
| 80-DIG-026 | 79-DIG-001E | −17.37 | −17.37 | −0.01 | −7.30 | −4.59 | −2.71 |
| 79-DIG-001E | 79-DIG-024 | −8.66 | 0.34 | −9.00 | 4.62 | −0.94 | 5.55 |
| 80-DIG-026 | 82-SRE-143 | −58.83 | −43.49 | −15.33 | −7.35 | −7.36 | 0.01 |
| 82-SRE-143 | 82-SRE-103 | 25.24 | 28.74 | 3.50 | −19.35 | −19.88 | 0.53 |
| 80-SRE-143 | 79-DIG-024 | 14.74 | 26.46 | −11.72 | 1.31 | 1.83 | −0.52 |
| 80-DIG-026 | 80-SRE-112C3 | 18.96 | 3.64 | 15.32 | −3.09 | −5.79 | 2.70 |
| 80-SRE-112C3 | 79-DIG-024 | 0.42 | −20.68 | 21.09 | −4.77 | 0.26 | −5.03 |
| 79-DIG-001E | 80-SRE-103 | 11.63 | 2.62 | 9.01 | −30.90 | −22.64 | −8.62 |
| 80-SRE-112C3 | 80-SRE-103 | −23.86 | −18.39 | −5.47 | −13.70 | −21.44 | 7.74 |

In the table INTER=Intersection, HARM=Harmonization, and DIFF=Difference between intersection and harmonization.

While several embodiments of the invention have been shown and described, it will be understood that the invention is not limited thereto since many modifications may be made and will become apparent to those skilled in the art.

What is claimed is:

1. A method for developing correspondence between two groups of seismic traces obtained by different acquisition techniques by rendering the traces substantially alike in time and phase about a common subsurface feature at an intersection using trace calibration, comprising the steps of:
   (a) isolating reflections on the traces in each group of the seismic traces which represent the common subsurface feature which is proximate the intersection of the two groups of seismic traces;
   (b) determining time delays between the isolated reflections from the two groups of seismic traces;
   (c) determining a single time delay at the intersection between the isolated reflections from each group of traces by a least squares planar fit to the time delays of step (b) using a spatial distribution of the isolated reflections in an x-y coordinate system, the planar fit being used to calculate refined time delays between the isolated reflections;
   (d) determining a single phase shift at the intersection between the isolated reflections from each group of traces using the refined time delays of step (c); and
   (e) adjusting the traces of one group of the two groups of traces by the respective values determined in steps (c) and (d) to obtain correspondence between the two groups of seismic traces.

2. A method for obtaining a single phase shift and a single time delay at an intersection using portions of seismic traces which identify a common subsurface feature on the seismic traces, the seismic traces having been acquired by differing acquisition techniques, comprising the steps of:
   (a) isolating the portions of the seismic traces, a portion on each of the seismic traces being isolated which identifies the common subsurface feature, each said portion being an individual isolated portion;
   (b) determining time delays between the individual isolated portions, each time delay of the time delays being obtained by scanning an envelope of the squared cross correlation between the individual isolated portion from a first acquisition technique with the individual isolated portion from a second acquisition technique;
   (c) determining the single time delay at the intersection between the isolated portions of traces of each acquisition technique by a least squares planar fit to the time delays of step (b) using a spatial distribution of the seismic traces in an x-y coordinate system, the planar fit being used to calculate refined time delays between the individual isolated portions; and (d) determining the single phase shift at the intersection between the isolated portions of traces of each acquisition technique using the refined time delays of step (c).

3. A method for providing consistency about a common subsurface feature at an intersection between seismic traces obtained by two differing acquisition techniques, comprising the steps of:

(a) isolating portions of the seismic traces, a portion on each of the seismic traces being isolated which identifies the common subsurface feature, each said portion being an individual isolated portion;

(b) determining time delays between the individual isolated portions, each time delay of the time delays being obtained by scanning an envelope of the squared cross correlation between the individual isolated portion from a first acquisition technique with the individual isolated portion from a second acquisition technique;

(c) determining a single time delay at the intersection between the isolated portions of traces of each acquisition technique by a least squares planar fit to the time delays of step (b) using a spatial distribution of the seismic traces in an x-y coordinate system, the planar fit being used to calculate refined time delays between the individual isolated portions;

(d) determining a single phase shift at the intersection between the isolated portions of traces of each acquisition technique using the refined time delays of step (c); and (e) adjusting the seismic traces acquired by one acquisition technique by the respective values determined in steps (c) and (d) to make the common subsurface feature on the traces consistent at the intersection with the common subsurface feature on the traces acquired by the other acquisition technique.

4. A method for providing consistency about a common subsurface feature at intersections between groups of seismic traces obtained by differing acquisition techniques, comprising the steps of:

(a) selecting two groups of seismic traces from the groups of seismic traces and selecting an intersection for the two groups of seismic traces;

(b) isolating a portion of each seismic trace of step (a) identifying the common subsurface feature;

(c) determining time delays between the isolated portions, the time delays being obtained by scanning an envelope of the squared cross correlation between individual isolated portions from a first acquisition technique with individual isolated portions from a second acquisition technique;

(d) determining a single time delay at the intersection between the isolated portions of each acquisition technique by a least squares planar fit to the time delays of step (b) using a spatial distribution of the seismic traces in an x-y coordinate system, the planar fit being used to calculate refined time delays between the individual isolated portions;

(e) determining a single phase shift at the intersection between the isolated portions of each acquisition technique using the refined time delays of step (d);

(f) repeating steps (a) through (e) for additional intersections and groups of seismic traces until all groups of seismic traces and intersections have been processed;

(g) harmonizing the intersection time delays and phase shifts by a least squared fit to determine a time delay and a phase delay for each group of seismic traces; and (h) adjusting the seismic traces of each group by the values obtained in step (g) to obtain seismic traces having consistency about the common subsurface feature at each intersection.

5. A method for obtaining a single time delay and a single phase shift between trace gates from two sets of data at an intersection, the two sets of data containing seismic traces, the seismic traces being time varying signals with variations in amplitude and phase representing reflections from subsurface features, a trace gate being a portion of a seismic trace containing reflections representative of a common subsurface feature in both sets of data, the intersection representing a region of proximity between the two sets of data over which reflections originate from approximately plane parallel layers with approximately constant reflection coefficients, comprising the steps of:

(a) selecting the intersection at which the single time delay and the single phase shift are to be obtained for the trace gates from the two sets of data;

(b) selecting at least one trace from each set of data to form a set of trace pairs, the selected traces from one set of data being the reference traces, the selected traces from the other set of data being the moving traces, and a trace pair being a reference trace paired with a moving trace;

(c) isolating portions of the moving and reference traces having the common subsurface feature by centering a time gate over the portions of reference traces having the common subsurface feature and centering the time gate over the moving traces having the common subsurface feature whereby the time gate isolates the trace gates from the reference and moving traces leaving only the trace gates of reference and moving traces in the set of trace pairs;

(d) selecting the trace pair;

(e) determining a time delay between the trace gates in the trace pair by scanning an envelope of the squared normalized cross correlation of the selected trace pair for the maximum;

(f) repeating steps (d) and (e) for all trace pairs;

(g) determining the single time delay at the intersection between the reference trace gates and the moving trace gates by a least squares planar fit to the time delays of step (f) using a spatial distribution of the traces of step (d) in an x-y coordinate system, the planar fit being used to calculate refined time delays for each trace pair; and (h) determining the single phase shift at the intersection between the reference trace gates and the moving trace gates using the refined time delays of step (g).

6. The method for obtaining a single time delay and a single phase shift between trace gates from two sets of data at an intersection in claim 5, further including the steps of:

(i) determining coherent filters after step (g) for the traces gates isolated in step (c);

(j) adjusting the trace gates with the respective coherent filter to equalize the amplitude spectra of the trace gates; and (k) repeating steps (d) through (g) and then going on to step (h).

7. The method for obtaining a single time delay and a single phase shift between trace gates from two sets of data at an intersection in claim 5, further including the steps of:

(i) determining incoherent filters after step (c) for the trace gates;

(j) adjusting the trace gates with the respective incoherent filter to equalize the amplitude spectra of the trace gates; and (k) continuing with step (d).

8. The method for obtaining a single time delay and a single phase shift between trace gates from two sets of data at an intersection in claim 5, wherein in step (a) each set of data includes a line of seismic data.

9. The method for obtaining a single time delay and a single phase shift between trace gates from two sets of data at an intersection in claim 5, wherein in step (a) each set of data includes vertical seismic profile data, each set of vertical seismic profile data having at least one vertical seismic profile trace therein.

10. The method for obtaining a single time delay and a single phase shift between trace gates from two sets of data at an intersection in claim 5, wherein in step (a) one set of data includes vertical seismic profile data, the vertical seismic profile data having at least one vertical seismic profile trace therein and the other set of data includes a line of seismic data.

11. The method for obtaining a single time delay and a single phase shift between trace gates from two sets of data at an intersection in claim 5, wherein in step (a) one set of data includes vertical seismic profile data, the vertical seismic profile data having at least one vertical seismic profile trace therein and the other set of data includes well log synthetic trace data, the well log synthetic trace data having at least one well log synthetic trace therein.

12. The method for obtaining a single time delay and a single phase shift between trace gates from two sets of data at an intersection in claim 5, wherein in step (a) one set of data includes a line of seismic data and the other set of data includes well log synthetic trace data, the well log synthetic trace data having at least one well log synthetic trace therein.

13. A method for adjusting a subsurface feature common to seismic traces from two sets of data so that the common subsurface feature on the traces is consistent between the two sets of data at an intersection, the seismic traces being time varying signals having variations in amplitude and phase representing reflections from subsurface features, the intersection representing a region of proximity between the two sets of data over which reflections originate from approximately plane parallel layers with approximately constant reflection coefficients, comprising the steps of:

(a) selecting the intersection to which a single time delay and a single phase shift are to be obtained for trace gates from the two sets of data, a trace gate being a portion of a seismic trace containing reflections representative of the common subsurface feature in both sets of data;

(b) selecting at least one trace from each set of data to form a set of trace pairs, the selected traces from one set of data being the reference traces, the selected traces from the other set of data being the moving traces, and a trace pair being a reference trace paired with a moving trace;

(c) isolating portions of the moving and reference traces having the common subsurface feature by centering a time gate over the portions of reference traces having the common subsurface feature and centering the time gate over the moving traces having the common subsurface feature whereby the time gate isolates the trace gates from the reference and moving traces leaving only the trace gates of reference and moving traces in the set of trace pairs;

(d) selecting the trace pair;

(e) determining a time delay between the trace gates in the trace pair by scanning an envelope of the squared normalized cross correlation of the selected trace pair for the maximum;

(f) repeating steps (d) and (e) for all trace pairs;

(g) determining the single time delay at the intersection between the reference trace gates and the moving trace gates by a least squares planar fit to the time delays of step (f) using a spatial distribution of the traces of step (d) in an x-y coordinate system, the planar fit being used to calculate refined time delays for each trace pair;

(h) determining the single phase shift at the intersection between the reference trace gates and the moving trace gates using the refined time delays of step (g); and (i) adjusting the seismic traces of the set of data from which the moving traces were selected by the values determined in step (g) and (h) to make the traces of both sets of data consistent about the common subsurface feature at the intersection.

14. The method for adjusting a subsurface feature common to seismic traces from two sets of data in claim 13 further including the steps of:

(j) determining coherent filters after step (g) for the trace gates isolated in step (c);

(k) adjusting the trace gates with the respective coherent filter to equalize the amplitude spectra of the trace gates; and (l) repeating steps (d) through (g) and then going on to step (h).

15. The method for adjusting a subsurface feature common to seismic traces from two sets of data in claim 13 further including the steps of:

(j) determining incoherent filters after step (c) for the trace gates;

(k) adjusting the trace gates with the respective coherent filter to equalize the amplitude spectra of the trace gates; and (l) continuing with step (d).

16. The method for adjusting a subsurface feature common to seismic traces from two sets of data in claim 13 wherein in step (a) each set of data includes a line of seismic data.

17. The method for adjusting a subsurface feature common to seismic traces from two sets of data in claim 13 wherein in step (a) each set of data includes vertical seismic profile data, each set of vertical seismic profile data having at least one vertical seismic profile trace therein.

18. The method for adjusting a common subsurface feature common to seismic traces from two sets of data in claim 13 wherein in step (a) one set of data includes vertical seismic profile data, the vertical seismic profile data having at least one vertical seismic profile trace therein and the other set of data includes a line of seismic data.

19. The method for adjusting a subsurface feature common to seismic traces from two sets of data in claim 13 wherein in the steps of:
   step (a) one set of data includes vertical seismic profile data, the vertical seismic profile data having at least one vertical seismic profile trace therein and the other set of data includes well log synthetic trace data, the well log synthetic trace data having at least one well log synthetic trace therein; and
   step (b) the reference traces are selected from the well log synthetic trace data and the moving traces being selected from the vertical seismic profile data.

20. The method for adjusting a subsurface feature common to seismic traces from two sets of data in claim 13 wherein in the steps of:
   (a) one set of data including a line of seismic data and the other set of data includes well log synthetic trace data, the well log synthetic trace data having at least one well log synthetic trace therein; and
   step (b) the reference traces being selected from the well log synthetic trace data and the moving traces being selected from the line of seismic data.

21. A method for adjusting a subsurface feature common to seismic traces from sets of data so that the common subsurface feature on the seismic traces is consistent between the sets of data at intersections of the sets of data, the seismic traces being time varying signals having variations in amplitude and phase representing reflections from subsurface features, comprising the steps of:
   (a) selecting two sets of data from the sets of data and selecting an intersection to which a single time delay and a single phase shift are to be obtained for trace gates from the two sets of data, the intersection representing a region of proximity between the two sets of data over which reflections originate from approximately plane parallel layers with approximately constant reflection coefficients, a trace gate being a portion of a trace containing reflections representative of the common subsurface feature in both sets of data;
   (b) selecting at least one trace from each set of data of step (a) to form a set of trace pairs, the selected traces from one set of data being the reference traces, the selected traces from the other set of data being the moving traces, and a trace pair being a reference trace paired with a moving trace;
   (c) isolating portions of the moving and reference traces having the common subsurface feature by centering a time gate over the portions of reference traces having the common subsurface feature and centering the time gate over the moving traces having the common subsurface feature whereby the time gate isolates the trace gates from the reference and moving traces leaving only the trace gates of reference and moving traces in the set of trace pairs;
   (d) selecting the trace pair;
   (e) determining a time delay between the trace gates in the trace pair by scanning an envelope of the squared normalized cross correlation of the selected trace pair for the maximum;
   (f) repeating steps (d) and (e) for all trace pairs;
   (g) determining the single time delay at the intersection between the reference trace gates and the moving trace gates by a least squares planar fit to the time delays of step (f) using a spatial distribution of the traces of step (d) on an x-y coordinate system, the planar fit being used to calculate refined time delays for each trace pair;
   (h) determining the single phase shift at the intersection between the reference trace gates and the moving trace gates using the refined time delays of step (g);
   (i) repeating steps (a) through (h) until the phase shift and time delay at all desired intersections for all sets of data have been determined;
   (j) harmonizing the phase shifts and time delays determined for the intersections in steps (g) and (h) by a least squares fit to determine a time delay and a phase shift for each set of data; and
   (k) adjusting all traces in each set of data by the time delay and phase shift of step (j) so that the traces of each set of data will be consistent about the common subsurface feature at the intersections.

22. The method for adjusting a subsurface feature common to seismic traces from sets of data in claim 21 wherein in the steps of:
   (a) the sets of data include a set of well log synthetics trace data, the set of well log synthetics data having at least one well log synthetics trace;
   (b) the reference traces being selected from the well log synthetic data; and
   (j) during harmonization the set of well log synthetics being held to zero phase shift, the other sets of data having their phase shifts harmonized to the zero phase shift of the well log synthetics data.

* * * * *